(12) United States Patent
Soini et al.

(10) Patent No.: US 11,358,421 B2
(45) Date of Patent: Jun. 14, 2022

(54) TIRE MONITORING SYSTEM HAVING A CONTROL UNIT CONFIGURED TO OPERATE IN A POWER SAVING MODE AND A NORMAL MODE

(71) Applicant: Nokian Renkaat Oyj, Nokia (FI)

(72) Inventors: Teemu Soini, Tampere (FI); Jani Räisänen, Pirkkala (FI); Atte Antikainen, Pirkkala (FI); Jari Ojala, Nokia (FI)

(73) Assignee: Nokian Renkaat Oyj, Nokia (FI)

( * ) Notice: Subject to any disclaimer, the term of this patent is extended or adjusted under 35 U.S.C. 154(b) by 0 days.

(21) Appl. No.: 17/599,315

(22) PCT Filed: Mar. 9, 2020

(86) PCT No.: PCT/EP2020/056156
§ 371 (c)(1),
(2) Date: Sep. 28, 2021

(87) PCT Pub. No.: WO2020/200660
PCT Pub. Date: Oct. 8, 2020

(65) Prior Publication Data
US 2022/0088978 A1    Mar. 24, 2022

(30) Foreign Application Priority Data
Mar. 29, 2019 (EP) .................... 19397508

(51) Int. Cl.
*B60C 23/04*   (2006.01)
*B60C 23/20*   (2006.01)
(52) U.S. Cl.
CPC ........ *B60C 23/0454* (2013.01); *B60C 23/041* (2013.01); *B60C 23/0488* (2013.01); *B60C 23/20* (2013.01)

(58) Field of Classification Search
None
See application file for complete search history.

(56) References Cited

U.S. PATENT DOCUMENTS

| | | | | |
|---|---|---|---|---|
| 7,999,663 B2 * | 8/2011 | Mancosu | ............ | B60C 23/0493 340/445 |
| 8,700,286 B2 * | 4/2014 | Steiner | .................... | B60C 23/00 701/71 |

(Continued)

FOREIGN PATENT DOCUMENTS

| CN | 1476391 A | 2/2004 |
|---|---|---|
| JP | 2018127091 A | 8/2018 |

(Continued)

OTHER PUBLICATIONS

Extended European Search Report for European Patent Application No. 19397508.3 dated Oct. 2, 2019, 5 pages.

(Continued)

*Primary Examiner* — Peter J Macchiarolo
*Assistant Examiner* — Jermaine L Jenkins
(74) *Attorney, Agent, or Firm* — Merchant & Gould P.C.

(57) ABSTRACT

A pneumatic tire includes a first tread area portion, an electric power source, a transmission device, an accelerometer, and a control unit configured to operate in a power saving mode and a normal mode. A contact of the first tread area portion with a surface is detected by sensing acceleration of the first tread area portion by the accelerometer. The control unit is configured to switch from the normal mode to the power saving mode after a detection that the first tread area portion is on a contact patch of the tire. The control unit is configured to switch from the power saving mode to the normal mode when a first specified time depending on the rotation speed of the tire has elapsed since the detection that the first tread area portion is on the contact patch. A (Continued)

monitoring method and a system are used with the pneumatic tire.

16 Claims, 8 Drawing Sheets

(56) References Cited

U.S. PATENT DOCUMENTS

| | | | |
|---|---|---|---|
| 9,581,610 B2* | 2/2017 | Yu | B60C 23/0416 |
| 9,844,985 B2* | 12/2017 | Mueller | B60C 23/0411 |
| 9,862,240 B2* | 1/2018 | Barrilado | B60C 29/005 |
| 2009/0293602 A1 | 12/2009 | Gotschlich | |
| 2013/0166166 A1 | 6/2013 | Steiner et al. | |
| 2020/0208969 A1* | 7/2020 | Suzuki | B60C 19/00 |

FOREIGN PATENT DOCUMENTS

| | | |
|---|---|---|
| WO | 02/20287 A1 | 3/2002 |
| WO | 2015/075494 A1 | 5/2015 |

OTHER PUBLICATIONS

International Search Report and Written Opinion issued in corresponding International Patent Application No. PCT/EP2020/056156, dated May 12, 2020, 15 pages.

Chinese Office Action for CN Application No. 202080025991.2 dated Feb. 8, 2022 (10 pages, with English translation).

Japanese Office Action for JP Application No. 2021-558021 dated Mar. 3, 2022 (6 pages, with English translation).

* cited by examiner

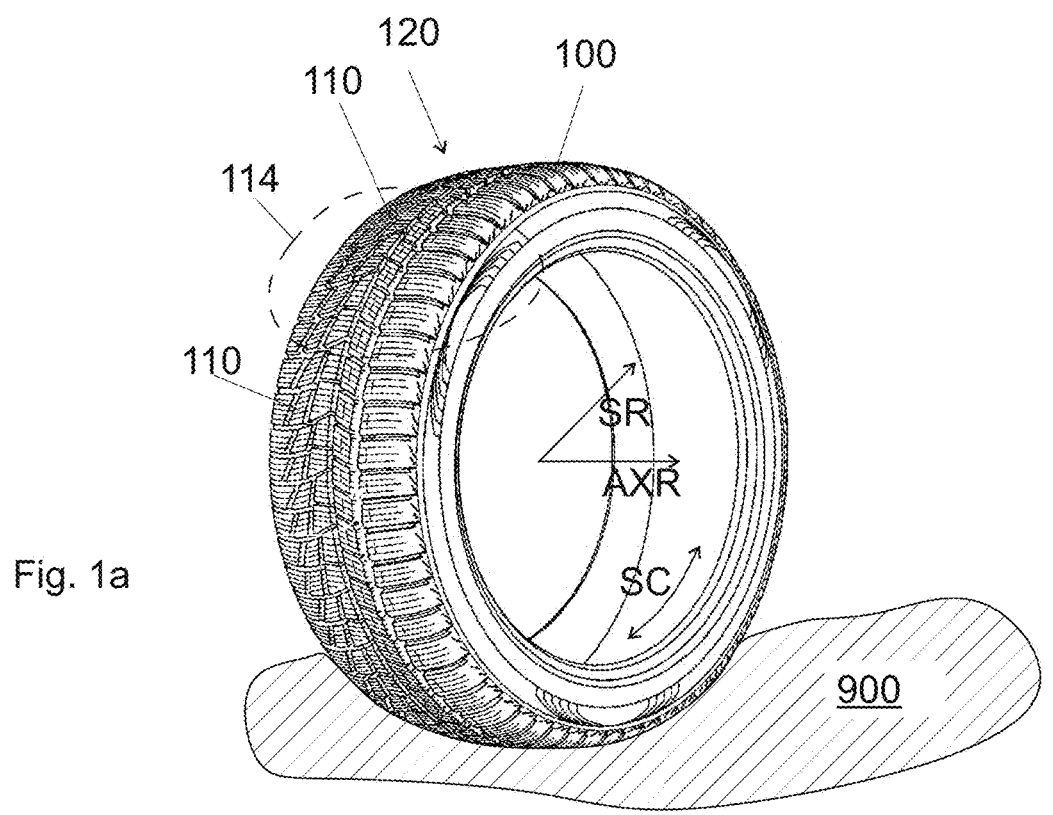
Fig. 1a
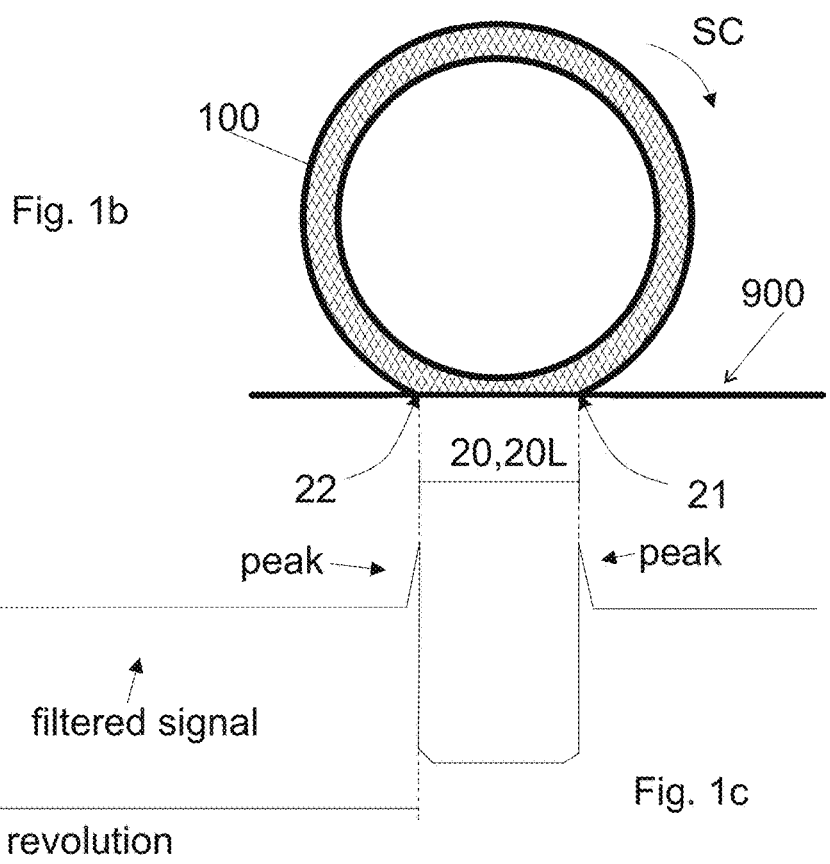
Fig. 1b
Fig. 1c

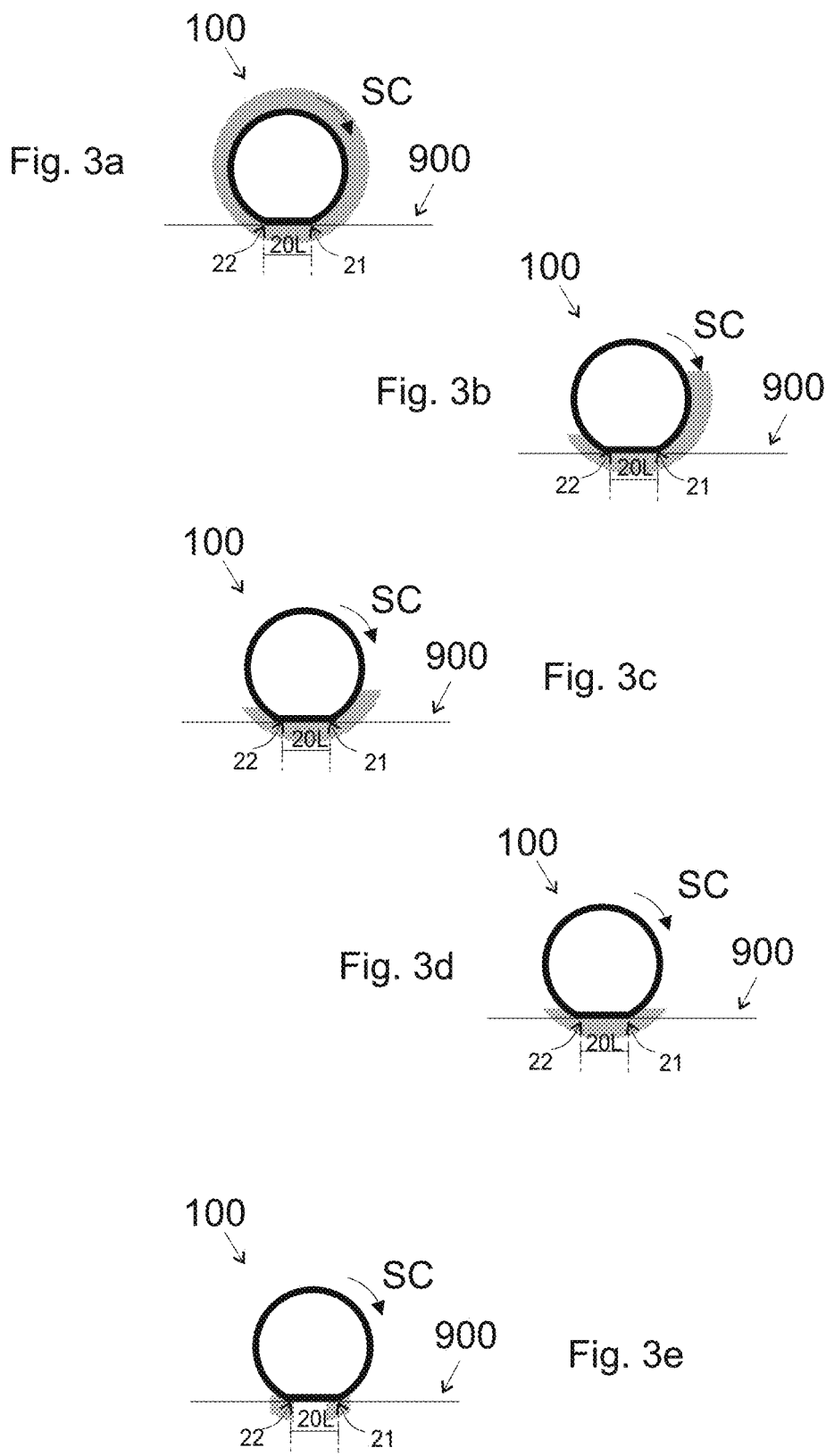

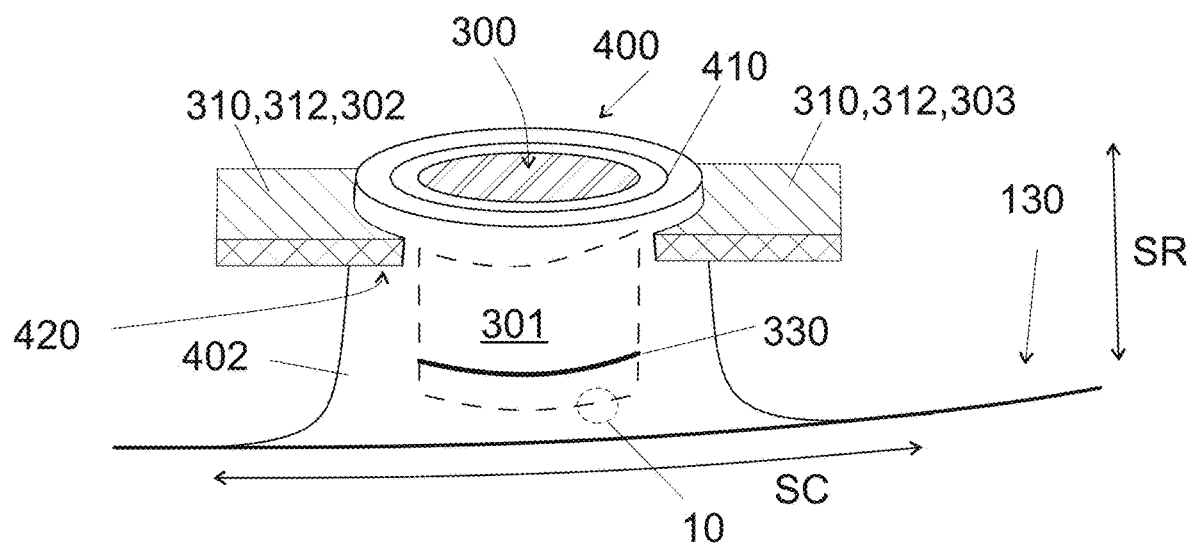
Fig. 5a  (4)
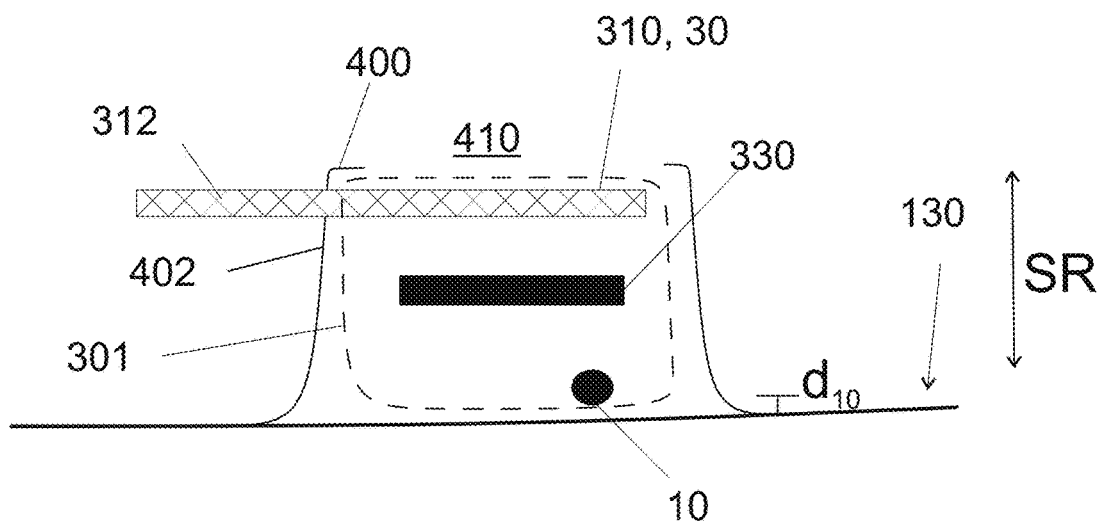
Fig. 5b

TIRE MONITORING SYSTEM HAVING A CONTROL UNIT CONFIGURED TO OPERATE IN A POWER SAVING MODE AND A NORMAL MODE This application is a National Stage Application of PCT/EP2020/056156, filed 9 Mar. 2020, which claims benefit of Ser. No. 19/397,508.3, filed 29 Mar. 2019 in the European Patent Office, and which applications are incorporated herein by reference. To the extent appropriate, a claim of priority is made to each of the above disclosed applications.

TECHNICAL FIELD

The invention relates to a tire containing an accelerometer for sensing acceleration of the tire. The invention further relates to a monitoring system comprising a tire. The invention further relates to a monitoring method comprising a tire.

BACKGROUND

It is known that tires may be equipped with devices for sensing measures of interest such as air pressure within a tire. However, there is no commercially feasible way to measure a contact patch length of a tire on a moving car at the moment. Currently, a contact patch length of a tire can be determined, for example, by stationary on ground installed devices.

SUMMARY

A pneumatic tire can be configured to rotate about an axis of rotation. The tire can comprise a tread comprising a first tread area portion, the tread being configured to form a contact with a surface when the tire is used, wherein an area of said contact of the tread with the surface forms a contact patch having a leading edge and a trailing edge.

The tire advantageously comprises an accelerometer arranged between the first tread area portion and the axis of rotation. Further, the tire can comprise an electric power source, such as a battery, and/or an energy harvesting device. Furthermore, the tire can comprise a transmission device, preferably comprising an antenna.

The tire can further comprise a control unit configured to operate in a power saving mode and a normal mode, wherein in said normal mode the control unit is configured to measure acceleration by the accelerometer, and in the power saving mode the control unit is configured to save power by not measuring acceleration by the accelerometer.

A contact of the first tread area portion with the surface can be detected by sensing the acceleration of the first tread area portion by said accelerometer, wherein a signal of said accelerometer shows a deformation of said first tread area portion during passage of said first tread area portion in the contact patch. Furthermore, a time required for the tire to make one revolution can be determined, for example, by using a timer for measuring time together with the signal(s) of the accelerometer.

When a time required for the tire to make one revolution is determined at a current speed, at least at a certain accuracy, the control unit can be configured to switch from the normal mode to the power saving mode after a detection that the first tread area portion is on the contact patch. Further, the control unit can be configured to switch from the power saving mode to the normal mode when a first specified time depending on the rotation speed of the tire, such as between 0.10 and 0.99 times the time required for the tire to make one revolution, has elapsed since said detection that the first tread area portion is on the contact patch in order to detect the leading edge and/or the trailing edge of the contact patch.

Further, when a time required for the tire to make one revolution is determined at a current speed, at least at a certain accuracy, the control unit can be configured to switch from the normal mode to the power saving mode after a detection that the first tread area portion is on the trailing edge of the contact patch. Further, the control unit can be configured to switch from the power saving mode to the normal mode when a first specified time depending on the rotation speed of the tire, such as between 0.10 and 0.99 times the time required for the tire to make one revolution, has elapsed since said detection that the first tread area portion is on the trailing edge of the contact patch, in order to detect the leading edge of the contact patch.

Furthermore, when a time required for the tire to make one revolution is determined at a current speed, at least at a certain accuracy, the control unit can be configured to switch from the normal mode to the power saving mode after a detection that the first tread area portion is on the leading edge of the contact patch. Further, the control unit can be configured to switch from the power saving mode to the normal mode when a second specified time depending on the rotation speed of the tire, such as between 0.01 and 0.05 times the time required for the tire to make one revolution, has elapsed since said detection that the first tread area portion is on the leading edge of the contact patch.

Advantageously, the control unit is configured to be in the power saving mode at least 20% of a time required for the tire to make one revolution in order to save energy.

The contact patch length can be determined based on said acceleration measurements wherein the contact of the first tread area portion with the surface is detected by sensing the acceleration of the first tread area portion by said accelerometer and using a timer together with said measurements to determine a time needed for one revolution and, finally, a time used to pass the contact patch, thereby obtaining the contact patch length.

The control unit can be configured to switch from the normal mode to the power saving mode after the determination of the contact patch length. Further, the control unit can be configured to switch from the power saving mode to a normal mode due to variation of the tire pressure exceeding a predetermined value, start of movement of a motor vehicle, preferably a start of movement following a halting of the vehicle for a period exceeding a predetermined stopping time, and/or to triggering of the control unit by an external command.

Measurement frequency of the accelerometer can be between 200 Hz and 8 000 Hz. Measurement frequency of the accelerometer is preferably at least 200 Hz, more preferably at least 300 Hz, and most preferably at least 400 Hz, and preferably 1000 Hz at the most, more preferably 900 Hz at the most and most preferably 800 Hz at the most when the control unit is on the normal mode and the speed of a vehicle having the tire is between 5 km/h and 30 km/h.

Further, measurement frequency of the accelerometer is preferably at least 200 Hz, more preferably at least 400 Hz, and most preferably at least 800 Hz, and preferably 7000 Hz at the most, more preferably 6000 Hz at the most and most preferably 4000 Hz at the most when the control unit is on the normal mode and the speed of a vehicle having the tire is between 30 km/h and 50 km/h.

Furthermore, measurement frequency of the accelerometer is preferably at least 2000 Hz, more preferably at least 3000 Hz, and most preferably at least 4 000 Hz, and preferably 10 000 Hz at the most, more preferably 8 000 Hz at the most and most preferably 6 000 Hz at the most when the control unit is on the normal mode and the speed of a vehicle having the tire is between 50 km/h and 100 km/h. Thus, it is possible to obtain reliable measurement results while keeping low energy consumption.

The pneumatic tire can further comprise a module comprising a processor, which is configured to determine said first specified time, and/or the second specified time. Further, the module can comprise a pressure sensor, and a temperature sensor. Furthermore, a transmission device can be configured to transmit data relating to pressure of the tire, a temperature of the tire, and a contact patch length of the tire, preferably to a gateway device and/or to a cloud server unit.

A monitoring system comprising the pneumatic tire can comprise a gateway device comprising at least
- a processing unit,
- a data storage unit for values of parameters and calculations, and
- computer code to be executed by the processing unit.

The gateway device can be configured to determine a load affecting the tire based on
- tire stiffness characteristics,
- pressure of the tire,
- temperature of the tire, and
- contact patch length of the tire.

The monitoring system can comprise a vehicle having at least 1 tire, preferably at least 2 tires, more preferably at least 3 tires, and most preferably at least 4 tires, and the gateway device can be configured to determine a total load affecting said vehicle based on the determined load of each of the tires.

A monitoring method for saving energy can comprise the following steps:
- detecting a contact of the first tread area portion with the surface by sensing the acceleration of the first tread area portion by the accelerometer, wherein a signal of said accelerometer shows a deformation of said first tread area portion during passage of said first tread area portion in the contact patch,
- determining a time required for the tire to make one revolution using the acquired signals,
- detecting when the first tread area portion is on the contact patch using the acquired signals,
- switching the control unit from the normal mode to the power saving mode after said detection that the first tread area portion is on the contact patch,
- switching from the power saving mode to the normal mode when a first specified time depending on the rotation speed of the tire, such as between 0.15 and 0.99 times the time required for the tire to make one revolution, has elapsed since said detection that the first tread area portion is on the contact patch.

The method can further comprise the following step:
- determining a load on said tire based on acceleration signals, tire stiffness characteristics, pressure measurements, and/or temperature of the tire.

Typically, acceleration measurements consume a battery much faster than expected life of the tire, hence, these kinds of measurements are not feasible for commercial use. Thanks to the present invention, total measurement time of an accelerometer can be decreased. Furthermore, it is still possible to obtain reliable measurements for a contact patch length determination. Thus, energy consumption of the tire electronics can be substantially decreased. Further, thanks to the novel solution, the results of the analysis based on the contact patch length determination, such as a determined load of the tire, can be as accurate as with solutions using more energy for the measurements.

Thus, thanks to the present solution, it is possible to minimize energy consumption relating to a monitoring of a contact patch length of a tire.

The information of a load of a tire can be used, for example,
- for optimal tire inflation, because an optimal tire pressure depends on a load,
- range determination for example for electric cars, and/or
- braking distance estimation for example for autonomous cars.

An electronic module can be fixedly positioned close to an accelerometer. Thus, the electronic module may serve as a reading device. Such an arrangement enables reliable interaction between the electronic module and accelerometer. Further, such an arrangement can enable the electronic module to be equipped with other sensor(s) for sensing a measure of interest, such as air pressure, prevailing inside the tire.

The tire can further comprise a receptacle connected to an inner surface of the tire, into which receptacle a part of the module can be installed. The receptacle can comprise a wall or walls which can limit at least a first opening and a second opening such that part of the module—such as its antenna or a part of it—extends through at least the second opening. Thus, the wall(s) of the receptacle can laterally surround only a first part of the module such that the rest of the module—such as at least a part of its antenna—is arranged outside the receptacle. In the case of the antenna being thusly arranged, the part of the antenna that is arranged outside the receptacle is preferably electrically connected to the first part of the module which is surrounded by the wall or walls of the receptacle. Such an arrangement enables keeping the module and/or the accelerometer more securely in place by providing mechanical support especially in the radial direction, and by preventing the module from rotating within the receptacle.

Furthermore, by arranging at least part of the antenna to be the part or one of the parts of the module which reside(s) outside the receptacle has the benefit of foregoing the need to arrange an additional extending member or members in the module to extend through at least the second opening of the receptacle. Further still, by arranging at least part of the antenna to be the part or one of the parts of the module which resides outside the receptacle has the additional benefit of improving the signal strength of the antenna as the signal is not obstructed by the wall(s) of the receptacle and/or the other parts of the module housed within the receptacle.

Thanks to the present solution, a reliable low energy consumption contact patch determination can be obtained with an acceleration sensor.

BRIEF DESCRIPTION OF THE DRAWINGS

FIG. 1a illustrates a tire,
FIG. 1b illustrates a contact patch of a tire,
FIG. 1c illustrates an acceleration signal during rotation of a tire,
FIGS. 3a-e illustrates an operating principle for acceleration measurements,
FIG. 5a illustrates, as viewed diagonally form a side, a module installed in a receptacle, according to some examples,
FIG. 5b illustrates, in cross sections viewed from a side, a module installed in a receptacle, according to some examples.

Figure 2A:
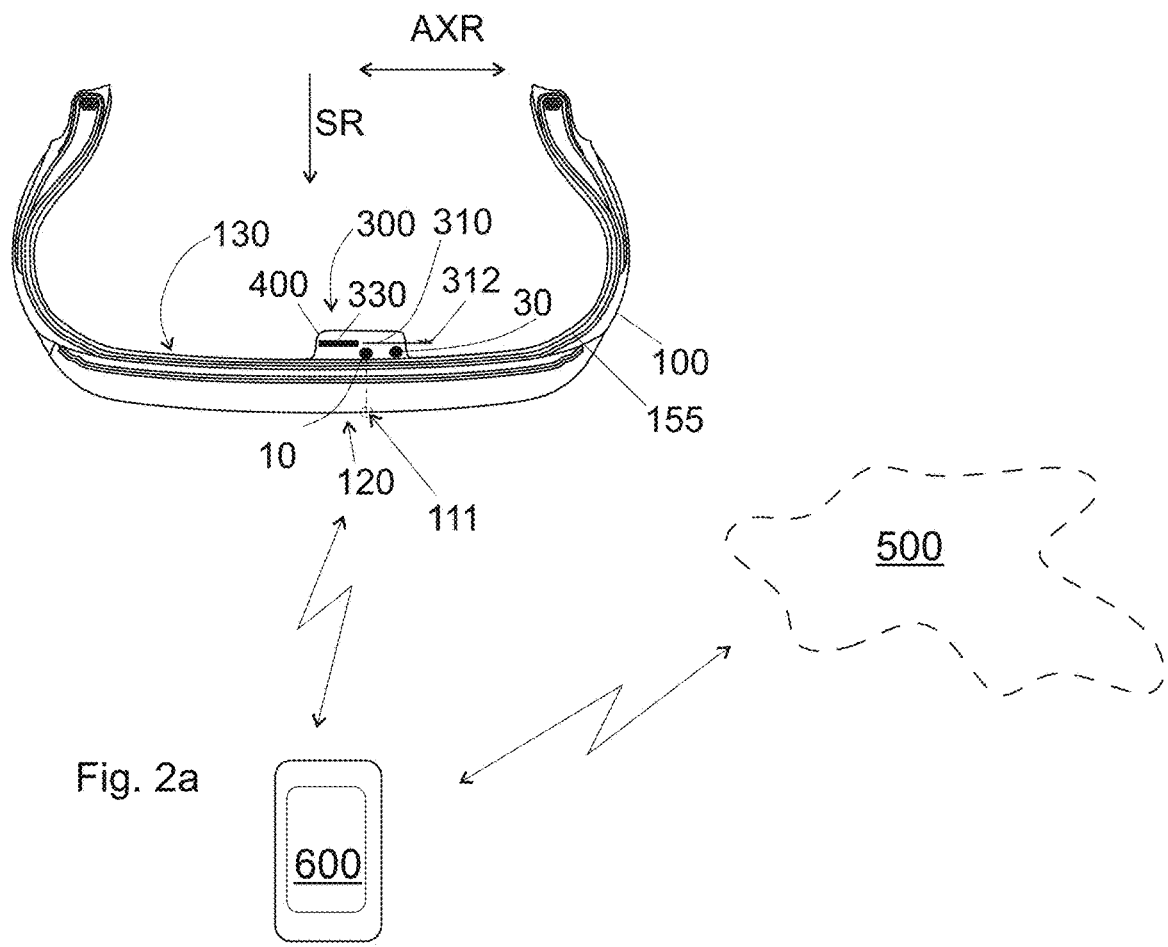
FIGS. 2a-c show an operating principle of the system, in accordance with an embodiment.

The Figures are intended to illustrate the general principles of the disclosed solution. Therefore, the illustrations in the Figures are not necessarily in scale or suggestive of precise layout of system components.

DETAILED DESCRIPTION

In the text, references are made to the Figures with the following numerals and denotations:
10 accelerometer,
20 a contact patch
20L length of the contact patch, i.e., contact patch length,
21 leading edge of the contact patch,
22 trailing edge of the contact patch,
30 secondary sensor arrangement such as a temperature sensor or a pressure sensor,
30a temperature sensor,
30b pressure sensor,
50 control unit,
100 tire,
110 tread block,
111 first tread area portion,
114 tread pattern,
120 tread of tire,
130 inner surface of tire,
155 ply,
300 module,
301 first part of module,
302 second part of module,
303 third part of module,
310 communication circuit of tire,
312 antenna of tire,
320 primary inductive component,
330 power source of tire,
400 receptacle,
402 wall of receptacle,
403 floor of receptacle,
405 flange of receptacle,
407 first end of receptacle,
408 second end of receptacle,
410 first opening of receptacle,
420 second opening of receptacle,
450 protrusion of receptacle,
455 bulge of receptacle,
460 adhesive,
500 cloud server unit,
600 gateway device,
900 surface,
AXR axis of rotation of tire,
$h_{450}$ height of protrusion,
$d_{10}$ distance between accelerometer and inner surface of tire,
SC circumferential direction, and
SR radial direction In this application, the term "contact patch" refers to a portion of a motor vehicle's tire 100 that is in contact with a surface 900. Thus, it is the portion of the tire's tread that touches the surface 900, such as a road. Typically, the contact patches of the tires 100 of the motor vehicle are the only connections between the road and the motor vehicle. The contact patch can also be called as footprint of the tire.

In this application, the term "contact patch length" refers to a length of the contact patch of a tire.

In this application, the term "revolution" refers to rotation of the tire 100, i.e., for every one revolution the tire 100 will travel a distance substantially equal to its circumference. In other words, circumference of a tire 100 is substantially equal to one complete revolution of the tire.

In this application, the term "first tread area portion" refers to an area of the tread which is on the same radial direction of the tire as the accelerometer, i.e., the accelerometer 10 is arranged between the first tread area portion 111 and the axis of rotation AXR.

In this application, the term "leading edge of the contact patch" refers to the beginning of the contact patch, i.e. to the point wherein the first tread area portion 111 comes to a contact with the surface 900 in the current position of the tire.

In this application, the term "trailing edge of the contact patch" refers to the end of the contact patch, i.e., to the point wherein first tread area portion 111 leaves from a contact with the surface 900 in the current position of the tire.

Figure 6A:
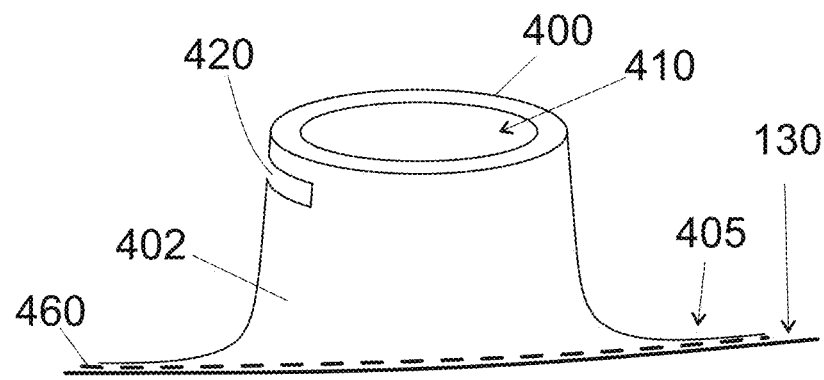
FIG. 6a illustrates, as viewed diagonally from a side, a receptacle attached to the inner surface of a tire.
Figure 6B:
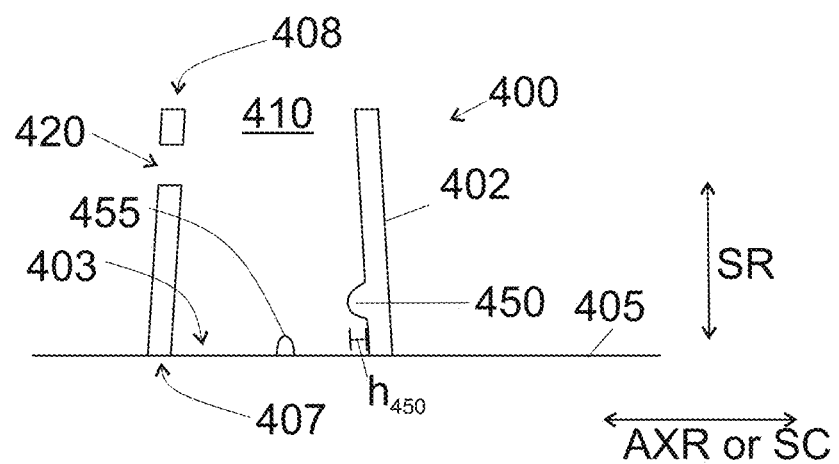
FIG. 6b illustrates, in a cross section viewed from a side, a receptacle comprising a protrusion and a bulge.

FIGS. 1a-1b, 2a, 3a-3e, 4a-4b and 5a-5b disclose a tire, or at least a part of a tire, comprising an accelerometer 10. FIGS. 6a-6b disclose a receptacle for a tire, which preferably comprises the accelerometer 10. Other Figures disclose operating principles of a system comprising the tire and the accelerometer 10 therein.

The tire 100 can be a pneumatic tire. Such a tire may be, for example, a tire for a passenger motor vehicle, such as a passenger car or a motorcycle. Such a tire 100 may be, for example, a so-called heavy tire, for a heavy machine such as a truck, a caterpillar, a harvester or a front loader.

Such a tire 100 typically comprises a tread 120, which is in contact with a surface 900 such as a road surface during the normal use of the tire 100. Such a tread 120 typically comprises a tread pattern 114 which comprises a plurality of tread blocks 110.

The tread 120 comprises a first tread area portion 111. The tread can be configured to form a contact with a surface 900 when the tire 100 is used. An area of the contact of the tread 120 with the surface 900 forms a contact patch 20 having a leading edge 21 and a trailing edge 22.

As is typical for certain types of tires 100, the tire 100 can comprise a reinforcing belt arranged between the tread 120 and the inner surface 130 of the tire 100. As is known, such a tire 100 may rotate around an axis of rotation AXR, in which case an outward centrifugal force acts on the constituent parts of the tire 100 along a radial direction SR.

The tire 100 can comprise a module 300 (shown for example in FIGS. 4a, 4b, and 5a) as described more in detail below. Preferably, the module 300 is electronic, i.e. an electronic module 300. The module 300 is positioned in the tire 100 itself. The module 300 itself, can comprise a sensor 10, 30, 30a, 30b for sensing a measure of interest. The tire can comprise a receptacle 400 connected to an inner surface 130 of the tire, into which receptacle 400 a part of the module 300 can be installed.

The tire 100 comprises at least one accelerometer 10. The accelerometer 10 can be installed inside the receptacle 400, or at least partly inside the receptacle 400. Hence, the electronic module 300 can be fixedly positioned close to the accelerometer 10 for which the electronic module may serve as a reading device. Such an arrangement enables reliable interaction between the electronic module and the accelerometer 10. The accelerometer 10 can be placed near the module 300, inside the module 300, or at least partly inside the module, hence, it can use the power source, the antenna 312, and the communication circuit 310 of the module 300. When the accelerometer 10 is mounted, at least partly, inside the module 300 and/or the receptacle 400, it is possible to obtain flexible and firm installation. Further, the accelerometer can be mounted close to the inner surface 130, preferably on the inner surface 130 of the tire, in order to obtain reliable data. In an embodiment, the accelerometer is mounted at least partly inside the inner surface 130 of the tire 100. Further, the electronic module can be equipped with other sensor(s) for sensing a measure of interest, such as air pressure, prevailing inside the tire.

A tread area of a tire 100 on the surface 900 on the location of the accelerometer 10 is called as a first tread area portion 111. In other words, the first tread area portion 111 is the tread area of the tire 100, which is the nearest of the accelerometer 10.

A distance $d_{10}$ between the accelerometer 10 and the inner surface 130 of the tire 100 may be between 0 and 30, preferably less than 10 mm. Therefore, it is possible to obtain reliable data.

The tire may have one accelerometer or several accelerometers. If the tire comprises more than one accelerometer 10, the first tread area portion refers to the area, wherein the first accelerometer 10, which is measuring the acceleration, is placed. Further, in this case, there is also a second tread area portion, which refers to an area, wherein an optional second accelerometer 10, which is measuring an acceleration, is placed, and so on. However, due to practical reasons, such as the energy consumption of the measurements, most advantageously only one accelerometer 10 is installed for one tire 100. Thus, one tire 100 advantageously comprises exactly one accelerometer 10 in order to save energy.

A contact of the first tread area portion 111 with the surface 900 can be detected by sensing the acceleration of the first tread area portion 111 by said accelerometer 10. A signal of the accelerometer 10 can show a deformation of the first tread area portion 111 during passage of the first tread area portion 111 in the contact patch 20. In other words, a contact of the first tread area portion 111 with the surface 900 can be detected by sensing the acceleration of the first tread area portion 111 by said accelerometer 10.

The accelerometer 10 can be arranged on an inner surface 130 of the pneumatic tire 100 in between the first tread area portion and the axis of rotation AXR.

Several things have an effect on a contact patch length 20L. The contact patch length 20L may depend, for example, on pressure of the tire 100, temperature of the tire 100, characteristics of the tire 100, a surface 900 of a road, and a load on the tire 100. The contact patch length may be, for example, around 5% of the total surface length (circumference) of the tire 100.

The contact patch length 20L of a tire 100 typically increases when a load in the tire 100 increases. Further, the contact patch length 20L typically decreases when the inflation pressure increases. Further, the contact patch length depends on physical properties of the tire, such as tire geometry and stiffness.

The accelerometer 10 can be, for example, a radial and/or a tangential accelerometer 10. The accelerometer 10 can measure the acceleration, for example, on one, two or three measurement axes. Thus, the accelerometer 10 can be oriented radially, tangentially or axially. Most preferably, the accelerometer 10 is the tangential accelerometer. With tangential accelerometer, the contact patch can be measured and analyzed more accurately than, for example, with a radial accelerometer.

When the accelerometer 10 is on the contact patch 20, it is on a substantially flat region and, hence, an acceleration around 1 G (around 9.8 m/s$^2$) can be sensed. When the accelerometer 10 is on the leading edge and/or on the trailing edge, a high acceleration, so called peak, is typically sensed. This is illustrated in FIG. 1c. Thus, the accelerometer 10 can be used to determine the leading edge 21 and the trailing edge 22 of the contact patch 20.

If a radial accelerometer is used, as the tire rotates and the accelerometer 10 is off from the contact with the surface 900, a high centrifugal acceleration is sensed. Conversely, when the accelerometer 10 is on the contact patch 20, i.e., it is not rotating, a low acceleration is sensed. The edges (leading and trailing edges) are determined at the points where the acceleration transitions between the high and low values. Thus, the contact patch length 20L can be determined by the acceleration data showing the two edges, i.e., the leading edge and the trailing edge, of the contact patch 20. However, in order to obtain more accurate and/or more easily analyzed data, preferably a tangential accelerometer is used.

Measurement frequency of the accelerometer 10 can be at least 200 Hz or at least 500 Hz, more preferably at least 800 Hz or at least 1000 Hz, and most preferably at least 2 000 Hz, or at least 4 000 Hz. The higher measurement frequency will cause that the accuracy of the measurements increases. The measurement frequency of 200 Hz can be used only when speed of the car is very low. However, the higher the measurement frequency is, the higher is the energy consumption of the tire electronics. Thus, in order to save energy, measurement frequency of the accelerometer 10 is preferably 10 000 Hz at the most, more preferably 7 000 Hz at the most, and most preferably 6 000 Hz at the most.

The time required for the tire 100 to make one rotation can be determined by measuring the acceleration while measuring a time. The time required for the tire 100 to make one rotation can be determined, for example, by measuring the acceleration, determining when the first tread area portion 111 comes to the leading edge 21 of the contact patch 20 first time and second time, and analyzing how much time is needed for one revolution, and/or by measuring the acceleration, determining when the first tread area portion comes to a trailing edge 22 of the contact patch 20 a first time and a second time, and analyzing how much time is needed for the first tread area portion to come to the trailing edge 22 of the contact patch 20 second time, i.e., how much time is needed for one revolution, and/or by measuring the acceleration, determining when the first tread area portion 111 comes to the contact patch 20 first time and second time, and analyzing how much time is needed for one revolution, and/or by measuring the acceleration and determining when the first tread area portion 111 comes first to the leading edge 21 of the contact patch 20, then to the trailing edge 22 of the contact patch 20, and finally second time to the leading edge 21 of the contact patch, and analyzing how much time is needed for one revolution.

The acceleration signal can be corrupted by noise, such as noise caused by the tire rolling on a surface 900. Thus, the acceleration signal is preferably filtered. In an embodiment, an effect of gravity is removed by filtering the data and/or the effect of gravity is used to determine a location of the first tread area portion 111.

The filtered result can be analyzed to detect
a duration for one revolution,
edges of a contact patch, and
a time the first tread area portion 111 stays on the contact patch 20 during one revolution of the tire.

The contact patch length 20L can be detected by sensing the acceleration of the rotating tire 100 by means of an accelerometer 10 preferably mounted on an inner surface 130 of the tire, such as the tread lining thereof, most preferably at least partly inside the receptacle 400, while measuring a time.

Determining the rotational period of the tire 100 is based on the time between the occurrences of sequential acceleration variations at a leading edge 21 or at a trailing edge 22.

In order to determine a duration for one revolution and, in addition, a duration between the leading edge 21 and the trailing edge 22, the tire 100 can comprise a timer for measuring time. The timer is preferably an electrical timer. The timer can be coupled to a processor and/or to the accelerometer 10.

There is preferably an electronic module 300 (shown for example in FIGS. 4a-4b and 5a) that is used to provide tools to obtain and transmitting data. The timer is preferably positioned inside the module 300 of the tire 100.

The electronic module 300 can comprise a power source 330, preferably an electric power source 330 such as a battery, to provide electricity for powering the functionality of the electronic module 300, an antenna 312 to provide wireless connectivity, and a communication insert, such as a communication circuit 310 to perform measurements and communication via the antenna 312. The communication insert is preferably positioned above the battery. Therefore, the antenna 312 can be positioned to obtain an improved and/or an optimal signal strength and coverage. Furthermore, the battery can be attached close to the inner surface of the tire, thereby obtaining such a mass point of the module in with the module can be firmly attached close to the inner surface of the tire.

The communication insert is preferably coupled to
a processor of a tire 100, which can be linked to a transmitter further connected to an antenna,
a pressure sensor,
an acceleration sensor, and
optionally, a temperature sensor.

The tire 100 can comprise the accelerometer 10, for example, as inserted into the receptacle and/or into the electronic module 300. The accelerometer 10 can also be inserted into the inner surface of the tire 100. The module 300 offers some needed features, such as an electric source and antenna, for the accelerometer 10. Thus, the accelerometer is preferably at least partly inside the module 300, or at least coupled to or in contact with the module 300. Further, in order to measure the acceleration reliably, the accelerometer 10 is preferably positioned in a connection with the inner surface of the tire.

The accelerometer 10 may be installed into the tire 100 upon manufacturing the tire 100, immediately following the manufacturing the tire 100 or as an aftermarket installation for example by a third party. The tire 100 may comprise one or more accelerometers 10, for example one or two accelerometer(s) 10 for sensing acceleration of the tire 100 in the installation position of the accelerometer. Most advantageously, the tire 100 comprises only one accelerometer 10 in order to save energy.

In the interest of the interaction between the acceleration 10 and the electronic module 300, the electronic module 300 as well as the accelerometer 10 are preferably positioned on the inner surface 130 of the tire 100. Further, for proper operation of the accelerometer, the accelerometer should be fixed to the tire 100 in a reliable manner.

The positioning of the electronic module 300 on the inner surface 130 of the tire 100 can be brought about by arranging in said position on the inner surface 130 of the tire 100 a receptacle 400 into which the accelerometer 10 as well as at least part of the electronic module 300 may be installed. Thus, preferably there is a receptacle 400 connected to the inner surface 130 of the tire 100 such that the receptacle 400 is adapted to receive and house the accelerometer and at least part of the electronic module 300.

The electronic module 300 or at least a part of it may be installed into the receptacle 400 upon manufacturing the tire 100, immediately following the manufacturing the tire 100 or as an aftermarket installation for example by a third party.

The receptacle 400 may be manufactured directly to the tire 100 e.g. during vulcanization. However, preferably, the receptacle 400 is fixed to the tire 100 after the tire 100 has been vulcanized. This allows for using conventional manufacturing methods for the tire 100 itself. The receptacle 400 may be fixed to the tire 100 by, for example, using a suitable adhesive as disclosed below.

The module 300 can be arranged on an inner surface 130 of the tire 100, wherein the inner surface 130 is opposite to the tread 120. The inner surface 130 can be a surface of an interior of a pneumatic tire 100. In particular, when the module 300 is arranged inside a pneumatic tire, the module may be used to measure acceleration, pressure and temperature. For such a purpose, the module 300 can comprise a secondary sensor arrangement 30. Such a secondary sensor arrangement 30 comprises sensor or sensors configured to measure the environment in which the module 300 is. The secondary sensor arrangement 30 may comprise e.g. at least one of a temperature sensor 30a and a pressure sensor 30b, preferably both of them.

Therefore, the receptacle 400 can comprise, in addition to the accelerometer 10 (i.e. acceleration sensor) used to measure an acceleration of the tire, a secondary sensor arrangement 30. Such a secondary sensor arrangement 30 may be configured to sense a measure of interest such as pressure and/or a temperature within the tire 100. If the secondary sensor arrangement 30 is to sense a measure of interest with respect to the interior of the tire 100, such as air pressure prevailing there, preferably the sensor of the secondary sensor arrangement 30 is exposed to the interior of the tire 100. Such exposure of the sensor of the secondary sensor arrangement 30 to the interior of the tire 100 may be, for example, via the first opening 410 of the receptacle 400. Such a sensor may be, for example, incorporated in or coupled with the communications circuit 310 or the antenna 312 of the electronic module 300.

The tire 100 may further comprise other indicator(s) to indicate a measure or measures of interest. Such measures of interest may include, for example, the degree of wear of the tread 120, the conditions such as moisture prevailing in the immediate environment outside the tire 100, or some force (s) to which the tire 100 is subjected.

The accelerometer 10, which is installed to the tire 100, moves rapidly with the rotating tire. For example, when a typical passenger car travels at 100 km/h, its tires undergo about 14 revolutions per second. Thus, for proper operation of the accelerometer 10, the accelerometer 10 should be fixed to the tire 100 in a reliable manner.

The accelerometer 10 may be secured in its installing position, preferably at least partly within the receptacle 400 and/or at least partly within the module 300, with mechanical support. In addition, securing may be provided by arranging castable material. Such castable material may be adhesive. Such castable material may be, for example, epoxy, polyurethane, acrylic, silicone, or another thermoset polymer or thermoplastic polymer-based adhesive.

The accelerometer 10 can be arranged such that it is connected to the inner surface 130 of the tire 100. Thus, the accelerometer 10 can be against and attached to the inner surface 130 of the tire.

The accelerometer 10 consumes energy when measuring acceleration of the tire 100. Therefore, an energy source, such as a battery that is configured to convert chemical energy into electricity, is needed in order to use the accelerometer. However, the acceleration measurements as well as processing and transmitting said measurements can consume lots of energy. Thus, a battery life might be substantially lower than the usability time of the tire 100.

In order to save energy, the tire can have a control unit 50. The control unit is preferably connected with or coupled to the module 300 and/or is positioned inside the module 300. The control unit 50 can be configured to operate in a power saving mode and in a normal mode. In the normal mode, the control unit 50 can be configured to measure acceleration by the accelerometer 10. In the power saving mode, the control unit 50 can be configured to save power by not measuring acceleration by the accelerometer 10. Thus, the control unit 50 is able to turn the accelerometer (i.e., the sensor measuring the acceleration) on/off. This depends, for example, a revolution speed of the tire, i.e., a current position of the first tread area portion on the surface of the tire.

The acceleration sensor, i.e. the accelerometer 10, can be used to measure acceleration of the tire. According to the present solution, the accelerometer 10 is not measuring the acceleration all the time. Thus, the accelerometer 10 can be
- in a power saving mode, and
- in a normal mode, i.e., a measuring mode.

Thus, it is possible to decrease energy consumption of the acceleration measurements.

In the power saving mode, the activities relating to the calculation and monitoring of the characteristic data of the tire contact patch 20 can be inactivated. In other words, in the power saving mode the activities relating to the calculation and monitoring of the data representative of the length of the contact patch 20 of the tire on the surface 900 can be inactivated.

In the normal mode, the activities relating to the calculation and monitoring of the characteristic data of the tire contact patch 20 can be activated. Thus, in the normal mode, the accelerometer 10 is measuring the acceleration of the tire 100. The normal mode can comprise, for example, the following steps:
- measuring raw values by an accelerometer,
- optionally, determining filtered values from the raw values,
- determining the leading edge 21 of the contact patch 20,
- determining the trailing edge 22 of the contact patch 20, and
- checking the reliability of the data, for example by comparing the determined leading edge 21 and the trailing edge 22, and/or the contact patch length 20L with reference values, such as previously determined values.

The obtained accelerometer signal can be compensated for the influence of vehicle acceleration. Further, the signal can be filtered to remove an effect of the gravity and/or road roughness.

The peak-values of the accelerometer signal (shown in FIG. 1c) can be used to detect the leading edge and the trailing edge of the contact patch 20. Therefore, with a timer, a duration of one revolution, and a time the first tread area portion 111 stays on the contact patch 20 during one revolution of the tire can be determined. The durations are used to determine the contact patch length. Further, the data can be checked to determine that the accelerometer 10 is operating properly.

The control unit 50 can be activated for predetermined reasons. The contact patch length 20L can be analyzed when the pressure of the tire 100 increases or decreases significantly. The pressure may have been changed, for example, due to a pressure adjustment by a driver and/or modifying of a load on the tire. Thus, advantageously the control unit 50 switch to the normal mode after the pressure of the tire increases or decreases predetermined amount, such as at least 0.2 bar.

Further, the vehicle load may have been modified during halting. Therefore, the contact patch length 20L is preferably determined when a start of movement is detected after a halting of the vehicle for a period exceeding a predetermined stopping time. The predetermined stopping time, after which the control unit can switch from the power saving mode to the normal mode after the vehicle starts to move, can be determined. In other words, a start of movement of the tire following a halting of the tire for a period exceeding said predetermined stopping time can cause the control unit to switch from the power saving mode to the normal mode. Said predetermined stopping time can be at least one minute, preferably at least 5 minutes, and most preferably at least 10 minutes in order to save the energy consumption. Further, the predetermined stopping time, after which the control unit can switch from the power saving mode to the normal mode after the vehicle starts to move, can be 40 minutes at the most, more preferably 30 minutes at the most, and most preferably 20 minutes at the most in order to obtain reliable data. In other words, if the stopping time of the vehicle exceed the predetermined stopping time, the control unit can switch from the power saving mode to the normal mode after the vehicle starts to move.

Furthermore, the contact patch length characteristics may be needed in order to determine other properties of the vehicle. Thus, the control unit 50 can be configured to switch from the power saving mode to the normal mode due to triggering of the control unit 50 by an external command, for example, when contact patch length is needed for other properties of the vehicle.

When the control unit 50 is on the normal mode, the accelerometer 10 begins measurements, which may last several tire revolutions, such as between 1 and 1000 revolutions. Preferably the measurements last at least 10 revolutions, more preferably at least 15 revolutions. Therefore, it is possible to obtain reliable data. Further, preferably the measurements last 100 revolutions at the most, more preferably 50 revolutions at the most, and most preferably 30 revolutions at the most. Therefore, the energy consumption may be as small as possible, i.e., the relation between the energy consumption and the reliable enough data can be optimized.

In an embodiment, the control unit 50 is configured to switch from the normal mode to the power saving mode after the control unit 50 has determined that the obtained data relating to the contact patch length is reliable enough, i.e., the obtained data relating to the contact patch length is substantially the same (i.e., within predetermined limits) during at least two consecutive measured revolutions. In other words, the control unit 50 can be configured to switch from the normal mode to the power saving mode after a detection that the accuracy of the determined length of the contact patch is good enough, i.e., within a predetermined limit. This can further decrease the energy consumption.

Therefore, the control unit 50 can switch from the power saving mode to a normal mode due to, for example, variation of the tire pressure exceeding a predetermined value, a start of movement of the motor vehicle, and/or triggering of the control unit by an external command.

The load on the tire 100 may not be changed when the motor vehicle is moving, hence, the control unit 50 is preferably in the power saving mode as long as a load of the motor vehicle is not changing, especially, if the pressure of the tire is not changing too much. Thus, the control unit 50 can be configured to be in the power saving mode after the determination of the contact patch length as long as the motor vehicle is on a move, i.e. the speed of the motor vehicle is more than 0 km/h. Further, the control unit 50 is preferably configured to be in the power saving mode when the motor vehicle stays, i.e., the speed of the motor vehicle is 0 km/h. The control unit is preferably configured to switch from the power saving mode to the normal mode after the speed of the motor vehicle has first decreased to 0 km/h, then the stopping time has exceeded the predetermined stopping time and, finally, the vehicle has accelerated and the speed is at least 1 km/h.

Thus, the control unit 50 can be configured to be in the power saving mode after the contact patch length 20L is determined until the motor vehicle stops. Alternatively, the control unit 50 can be configured to be in the power saving mode for a predetermined time until the contact patch length 20L is re-checked. This may save energy consumption of the module 300 of the tire 100 significantly.

Therefore, the control unit 50 can be configured to be in the power saving mode if the speed of the motor vehicle is 0 km/h. Further, the control unit 50 can be configured to be in the power saving mode when a speed of the motor vehicle is 50 km/h or higher, more preferably 70 km/h or higher, and most preferably 90 km/h or higher.

Thus, the control unit 50 can be in the normal mode less than a minute per one starting time of a vehicle. This may significantly decrease the energy consumption. Furthermore, the control unit 50 can be in the power saving mode at least 20%, more preferably at least 50%, and most preferably at least 80% of a time used for one revolution of a tire, thus, the energy savings can be substantially increased.

The processor of the module 300 can be programmed to calculate a sequence of values representative of the length of the contact patch 20.

Further, the tire 100 can have a transmission mode. Thus, the control unit 50 can be in the transmission mode. In the transmission mode, at least the characteristic data of the tire contact patch 20 can be transmitted outside of the tire 100, preferably to a gateway device 600 and/or to a cloud service 500.

In the transmission mode, the processor of the module 300 can cause that the obtained values are transmitted to the gateway device 600 of the vehicle or to a cloud server unit 500. The values representative of the length of the contact patch can be calculated during the normal mode or during the transmission mode.

Transmitted data can be used to estimate the load on the tire 100. The transmission mode can comprise the following steps:

transmitting values representative of the length of the contact patch, pressure of the tire and temperature of the tire outside of the tire, preferably to the gateway device 600 or to the cloud server unit 500, and most preferably to the gateway device 600 in order to save energy consumption of the tire.

Thus, the obtained and preferably checked acceleration parameters or values obtained from the acceleration parameters can be transferred outside from the tire 100, and the accelerometer 10 can be switched off. After the transmission, the control unit 50 can be switched to the power saving mode. In an embodiment, if the transmitted sequence differs from the previously measured sequences at least a predetermined amount, the control unit 50 can switch back to the normal mode in order to re-check that the measured values are reliable and/or to get new more reliable data.

Most advantageously, the module 300 is configured to transmit values representative of the contact patch length 20L and/or the acceleration data only once for each time the motor vehicle starts to move, at least if variation of the tire pressure, or other above mentioned reasons, are not exceeding a predetermined value. Thus, only results having predetermined accuracy are sent from the module 300 forward from the tire 100. This may cause huge energy savings for the tire 100. Thus, the gateway device 600 can, in most advantageous situation, get only one contact patch length 20L result per a tire per one start of the motor vehicle.

In order to save energy consumption of the tire 100, the control unit 50 can be, partly, in the power saving mode also during a revolution of tire 100 in which the leading edge and the trailing edge are measured. This can be done because the acceleration needs to be measured only when the accelerometer is on the leading edge and on the trailing edge of the contact patch 20. This kind of power saving mode can significantly decrease energy consumption of the tire 100.

Figure 2B:
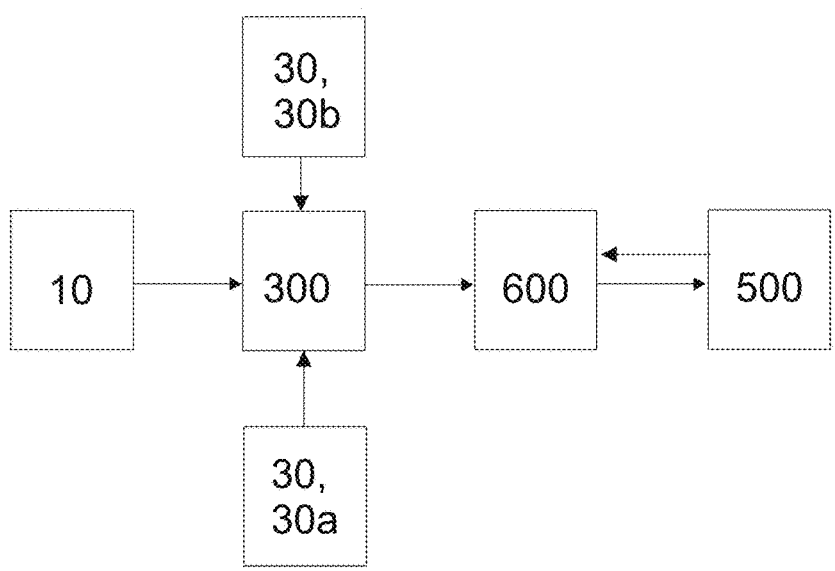
Figure 2C:
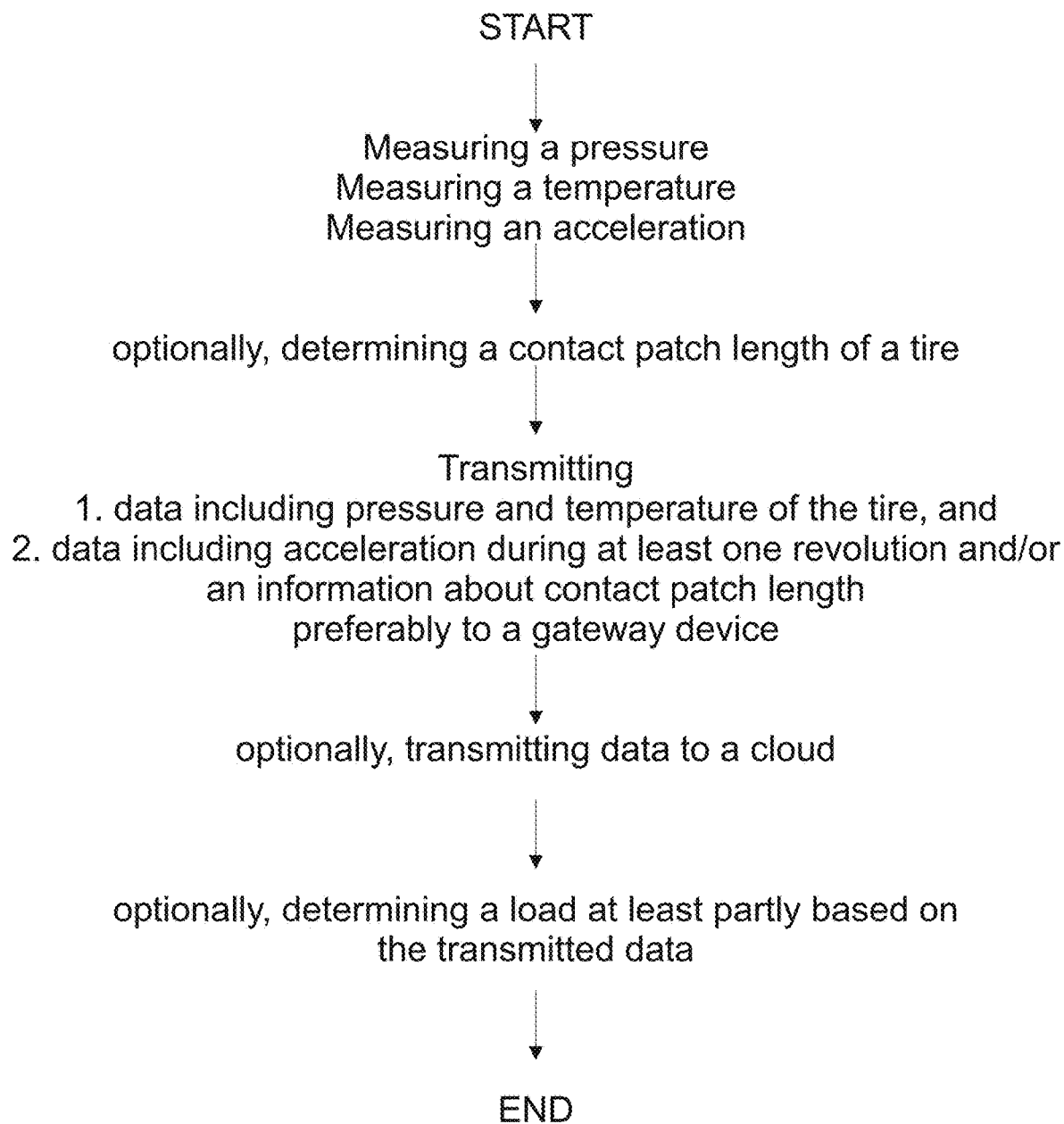
Figure 2D:
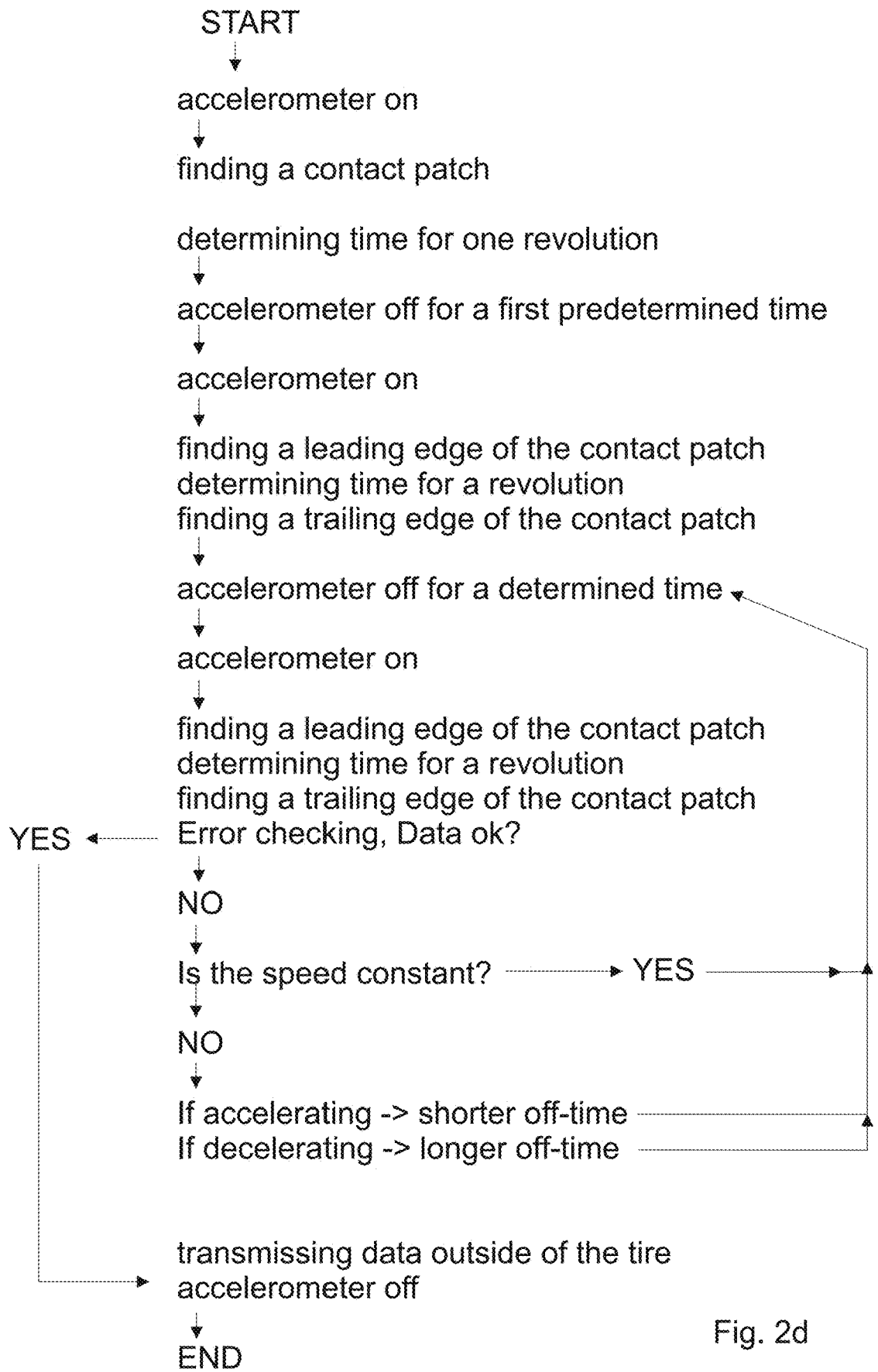
FIG. 2d shows an operating principle for acceleration measurements.

In FIGS. 3a-3e grey area shows the positions of the accelerometer 10, in which positions of the accelerometer 10, acceleration is preferably measured. Further, FIG. 2d shows an example of an operating principle.

For every one revolution, the tire 100 will travel a distance substantially equal to its circumference. A time required for the tire 100 to a revolution is preferably determined.

When a motor vehicle starts to move, a location of the accelerometer 10 is not typically known. Thus the location of the accelerometer 10 can be first determined. FIG. 3a illustrates the situation in the beginning, when the location of the accelerometer 10 is not known, i.e., it shows positions of the accelerometer 10 in which the acceleration is preferably measured, when the position of the accelerometer 10 is not known. In this case, lots of energy may be needed for one revolution of the tire 100, because the accelerometer 10 may be on during the whole revolution of a tire.

With each revolution of the tire 100, the leading edge 21 and the trailing edge 22 of the contact patch 20 can be known more precisely. When the duration of one revolution of the tire 100 and the position of the accelerometer 10 can be roughly determined, there is no need to measure the acceleration all the time. Therefore, the control unit 50 can be in the power saving mode at least part of a revolution of the tire 100. Thus, it is possible to decrease the time which the accelerometer is on during one revolution. This is beneficial, since the electric source 330 of the tire, such as a battery, may be hard to change or charge.

This is illustrated in FIGS. 3*a*-3*e*, which show in grey color positions of the accelerometer 10 in which the acceleration is preferably measured during one revolution of the tire; in the beginning (FIG. 3*a*) of the measurements, after at least the first revolution of the tire (FIGS. 3*b* and/or 3*c*), and when the trailing and leading edges 21,22 are quite well known (FIGS. 3*d* and/or 3*e*). In other words, the grey color illustrates the positions of the accelerometer 10 in which the accelerometer 10 is measuring an acceleration.

The control unit 50 can be configured to switch from the normal mode to the power saving mode after a detection that the first tread area portion is on contact patch, preferably on a trailing edge 22 of the contact patch 20. Further, the control unit 50 can be configured to switch from the power saving mode to the normal mode when a first specified time has elapsed since said detection that the first tread area portion is on the contact patch, and/or leaving from the contact patch. This is illustrated in FIGS. 3*b*-3*c*, wherein the grey area shows the position of the accelerometer 10, in which positions the acceleration is preferably measured when the location of the acceleration is roughly known. In this case, the accelerometer 10 is off when the accelerometer 10 is not positioned near the contact patch 20 and, hence, quite a lot of energy can be saved.

Further, finally the duration of one revolution of the tire as well as the position of the accelerometer on a current moment is substantially well known. Thus, the duration of the first specified time can be increased. FIG. 3*d* shows almost an optimal situation, wherein the accelerometer 10 is on only very small time during one revolution of the tire. Thus, the accelerometer 10 is off quite long time during one revolution of the tire. Thus, it is possible to decrease energy consumption of the tire 100 due to the power saving mode, wherein acceleration measurements are not done.

The most advantageously situation is disclosed in FIG. 3*e*. In this case, the position of the accelerometer 10 is well known and the accelerometer 10 is on only near the leading edge 21 and the trailing edge 22 of the contact patch 20. In this case, the control unit 50 can be configured to switch from the normal mode to the power saving mode after a detection that the first tread area portion is on a trailing edge 22 of the contact patch 20, and the control unit 50 can be configured to switch from the power saving mode to the normal mode when a first specified time has elapsed since said detection that the first tread area portion is on the trailing edge 22. Furthermore, the control unit 50 can be configured to switch from the normal mode to the power saving mode after a detection that the first tread area portion is on a leading edge 21 of the contact patch 20, and the control unit 50 can be configured to switch from the power saving mode to the normal mode when a second specified time has elapsed since said detection that the first tread area portion is on the leading edge 21. Thus, it is possible to obtain huge energy savings of the tire electronics. However, the situation illustrated in FIG. 3*d* may be the best compromise to save energy and obtain reliable results.

The time used for one revolution depends on a speed of a motor vehicle. Therefore, also said first specified time depends on the rotation speed of the tire 100. Furthermore, also said second specified time depends on the rotation speed of the tire 100.

The first specified time can be, for example, between 0.15 and 0.99 times the time required for the tire to make one rotation.

The first specified time can be at least 0.20, more preferably at least 0.50, and most preferably at least 0.85 times the time required for the tire to make one revolution. Thus, it is possible to increase the energy savings.

Further, the first specified time can be less than 0.98, more preferably less than 0.95, and most preferably less than 0.90 times the time required for the tire to make one revolution. Thus, it is possible to obtain reliable measurements with substantially good reduction of the energy consumption.

The second specified time can be at least 0.00, more preferably at least 0.01, and most preferably at least 0.02 times the time required for the tire to make one revolution. Thus, it is possible further decrease the energy consumption, because the whole time used for the accelerometer 10 to pass the contact patch is not measured. Further, the second specified time can be less than 0.05, more preferably less than 0.04 and most preferably less than 0.03 times the time required for the tire to make one revolution. Thus, it is possible to obtain reliable measurements.

The control unit 50 can be configured to be off at least 20%, or at least 30%, more preferably at least 50% or at least 60%, and most preferably at least 70% or at least 80% from the time of one revolution of the tire 100 when the accelerometer 10 is used to determine the leading edge and the trailing edge in order to save energy. The energy savings can increase along with the increased power saving time.

Furthermore, the control unit can be configured to be off less than 99%, more preferably less than 90% and most preferably less than 85% from the time of one revolution of the tire 100 when the accelerometer 10 is used to determine the leading edge and the trailing edge in order to obtain reliable data.

The measured data relating to the contact patch 20 can be digitally filtered by the processor of the tire 100 in order to obtain reliable data.

Preferably, a low pass filter is used to obtain reliable data. By using the low pass filter, it is possible to obtain more reliable data even when a lower measuring frequency is used. For example, by using the low pass filter, the measuring frequency can be up to 90% lower than without the filter. In an example, a measuring frequency of 1000-2000 measurements per revolution is needed to obtain reliable data without using any filter and, on the contrary, a measuring frequency of 100 to 200 measurements per revolution may be needed to obtain reliable data when the low pass filter is used. Therefore, the usage of the low pass filter can further save energy consumption of the module of the tire.

The first filtered values determining the length of the contact patch 20L can be compared with the second filtered values determining the length of the contact patch length. If the first filtered values and the second filtered values are close enough with each other (within a predetermined limit), the control unit can be switched into transmission mode. If the first filtered values and the second filtered values differs too much from each other, new measurements relating to the contact patch length are preferably obtained.

Advantageously, at least 3 or at least 5 and most preferably at least 10 filtered values determining the length of the contact patch 20 are determined and advantageously compared with each other to obtain reliable data to be transmitted. Further, in order to save energy, the measuring data relating to the length of the contact patch is transmitted only after the determination that the obtained data is reliable enough, hence, preferably not more than two, more preferably not more than one measuring data relating to the length of the contact patch 20 is transmitted during one determination of the contact patch length.

In order to further decrease the energy consumption, the control unit 50 can be configured to switch from the normal mode to the power saving mode after a detection that the accuracy of the determined length of the contact patch is good enough, i.e., within a predetermined limit.

The characteristics of the contact patch 20 of a tire 100 can be calculated during the first minutes, for example during the first 5 minutes, or during the first 100 seconds, of running of a motor vehicle. Further, the characteristics of the contact patch 20 can be calculated, for example from 3 to 7 times in an hour in order to be sure that the contact patch length 20L is still relevant and known. However, only results differing from the previously transmitted values are preferably sent outside of the tire, preferably to the gateway device 600.

The power source 330 of the tire 100 can be a battery. Preferably the battery is used to provide energy for the components and functioning of the electronic module 300. The accelerometer 10 preferably uses the power source 330 of the electronic module 300.

The power source 330 may be e.g. configured to transform mechanical and/or chemical energy to electric energy. As an alternative or in addition, the electric source may comprise a component configured convert magnetic energy into electricity. As an alternative or in addition, the electric source may comprise high-capacitance capacitor (e.g. a super capacitor) storing electric energy as such. Such a high-capacitance capacitor can be charged e.g. inductively or mechanically with a component transforming magnetic or mechanical energy, respectively, to electricity. A high-capacitance capacitor herein refers to a capacitor having a DC capacitance of at least 1 µF.

The power source 330 may comprise an energy harvesting device, such as a piezoelectric energy harvesting device or a triboelectric energy harvesting device, which device may comprise a battery and/or a capacitor as one of its elements. Most preferably, the power source 330 is a battery configured to provide electricity by converting chemical energy into electricity. Therefore, it is possible to achieve simple and cost-effective solution.

The power source 330, for example a battery, serving as an energy source for the electronic module 300 may be located, with respect to the radial direction SR, either between the level of the antenna 312 and the inner surface 130 of the tire 100, as is the case in the example illustrated in FIG. 5b, or between the level of the antenna 312 and the second end 408 of the receptacle 400. The electronic module may comprise a component made from paramagnetic material. In this case, preferably at least one of the power source 330 and a component made from paramagnetic of ferromagnetic material is located, with respect to the radial direction SR, between the level of the antenna 312 and the inner surface 130 of the tire 100.

It is preferable that the power source 330 is magnetically shielded, at least if the module 330 comprises a primary inductive component 320, in the interest of reducing or eliminating any currents within the power source 330, such as a battery, induced by the magnetic field of the primary inductive component 320. Thus, there may be a component made from paramagnetic or ferromagnetic material in the module 300.

The tire can comprise an antenna 312 (shown in FIGS. 5a-5b). The antenna 312 can be incorporated in a communications circuit 310 of the electronic module 300, or it may be separate from but in electric connection to the communications circuit 310. For example, as indicated in FIGS. 5a and 5b, the antenna 312 may be formed onto the same circuit board, onto which the communications circuit 310 is bonded. The circuit board may be flexible. Flexible structure may be the most suitable for tires. The circuit board is preferably in the form of a printed circuit board or a lead frame.

The information that the antenna 312 is configured to transmit can concern the acceleration measurements which are measured by the accelerometer 10 and pressure measurements which are measured by a pressure sensor 30b, as well as temperature measurements, which are measured by a temperature sensor 30a.

Figure 4A:
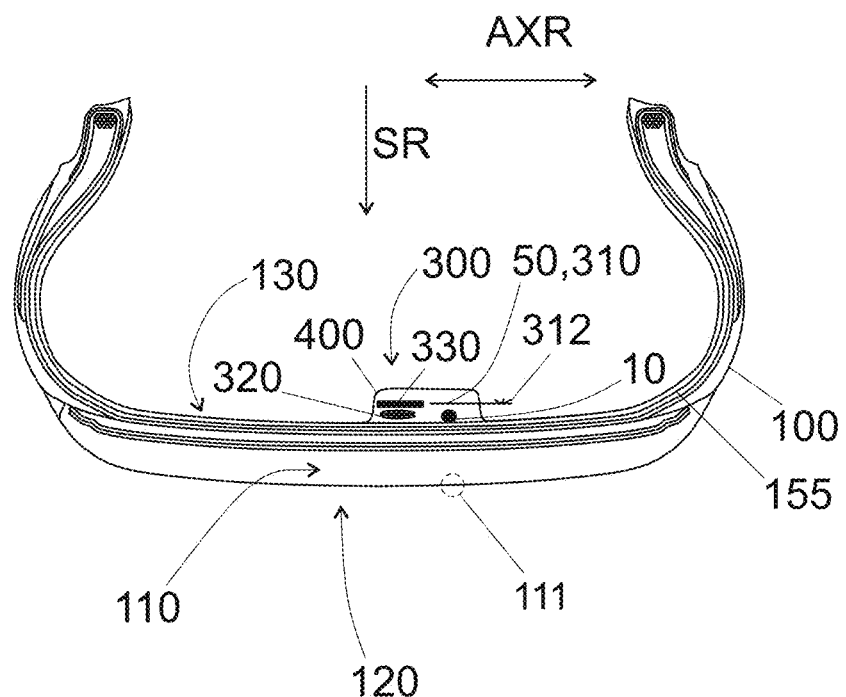
FIGS. 4a-b illustrate, in a half cross section, a tire comprising an accelerometer.
Figure 4B:
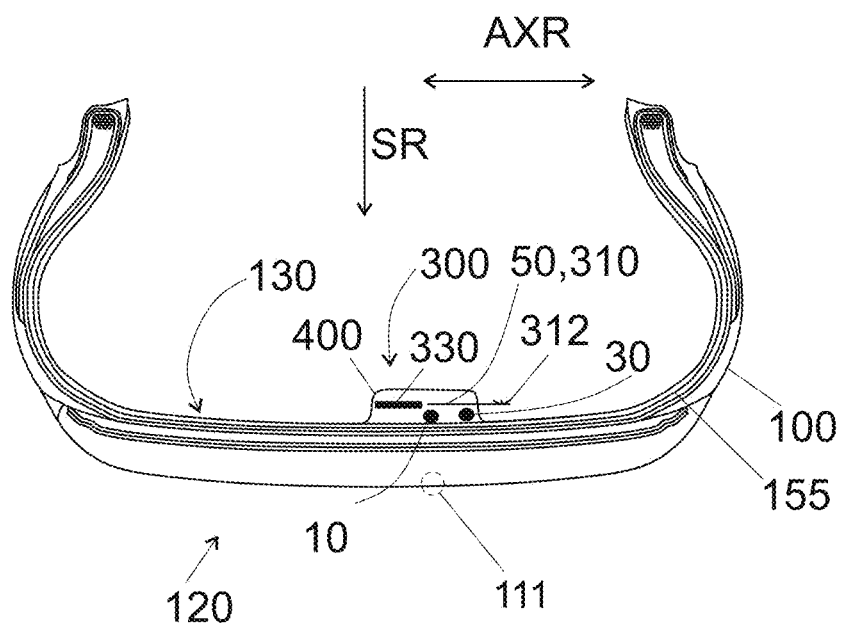

Thus, the information that the antenna 312 is configured to transmit may concern, not only the measurements of the accelerometer 10, but also the sensing of a measure of interest with a secondary sensor arrangement 30 of the electronic module 300 itself, as indicated in FIG. 4b. Thus, with the antenna 312, information relating to pressure, temperature and acceleration, such as contact patch length, can be wirelessly conveyed from the tire 100 to elsewhere for useful displaying, analysis and/or diagnostic purposes. Preferably, the antenna 312 is configured to transmit at least values based on the measurements of the accelerometer 10 and a pressure sensor, preferably also measurements based on a temperature sensor.

The information that the antenna 312 is configured to transmit may further concern other data, such as the sensing of a measure of interest with a passive circuit read with the electronic module 300.

The tire 100, and most preferably the module 300 therein, can be configured to measure at least an acceleration and a pressure, and a temperature of the tire. Moreover, in an embodiment, the module 300 is configured to determine a load using the measured data, but this may not be beneficial as the determining may use too much energy. Most advantageously, the module 300 can send the data, such as acceleration and pressure, indicative of the load further to the gateway device 600 or the cloud server unit 500, which is configured to determine a value of the load using the received data.

The module 300 can send at least some measured parameters to the gateway device 600 or directly to a cloud server unit 500. Preferably, the module 300 is configured to send the data to the gateway device located near the module 300 in order to save energy. This is illustrated in FIG. 2a-c.

The pneumatic tire 100 can further comprise a processor, which is configured to process data coming from the accelerometer 10. Advantageously the processor of the tire 100 is inside the module 300. The processor of the tire 100 can be needed in order to analyze the contact patch length 20L of the tire 100 and/or to determine whether the analyzing results relating to the contact patch characteristic of the tire 100 is accurate enough to be sent further, for example, to the gateway device 600.

The processor of the tire 100 can be configured to analyze
leading edge 21 of the contact patch 20,
trailing edge 22 of the contact patch 20, and/or
contact patch length 20L
based on the acceleration measurements.

Further, the processor of the tire 100 can be configured, at least, to determine the first specified time. Furthermore, the processor of the tire 100 can be configured to determine said second specified time.

However, the processor of the tire 100 is not preferably configured to analyze for example a load of the tire 100 in order to save energy consumption of the tire 100. Advantageously, the load of the tire 100 is analyzed in a gateway device 600 and/or in the cloud service unit 500.

The pneumatic tire 100 can also comprise memory for storing computer code to be executed by the processor and for storing data during the operation of the electronic module 300.

The communication circuit 310 may be used to transmit the measured data to a gateway device 600. The communication circuit 310 may comprise a control unit 50. In the alternative, the module 300 may comprise a separate control unit 50.

The monitoring system can be used for measuring a load of a tire 100. Such a system comprises the tire 100 (i.e. the tire with the accelerometer 10 and preferably the module 300 attached to it) and the gateway device 600 and/or the cloud server unit 500. The module 300 of the tire 100 can be configured to send data outside of the tire 100, preferably to the gateway device 600. The gateway device 600 can be configured to receive data from the tire 100, such as from the module 300. The gateway device 600 may be configured to communicate with a user. The gateway device 600 may be configured to communicate with the cloud server unit 500.

The contact patch length 20L, i.e., the tire deformation, can be computed based on the data coming from the accelerometer 10 as disclosed in this application. Further, a load on the tire can be determined when the information of the contact patch length 20L is used together with information showing pressure, temperature and physical properties of the tire 100. In other words, the outputs of the sensors 10, 30a, 30b can be used to determine a load on the tire 100 when used together with tire's stiffness characteristics.

A load on a tire 100 can be calculated, for example, when
a pressure of the tire,
optionally, a temperature of the tire,
tire's stiffness characteristics (i.e., physical properties of the tire), and
a contact patch length 20L of the tire
are known.

The electronic module 300 can be configured to read results of the accelerometer 10. Further, the electronic module can be configured to read results of the pressure sensor. Furthermore, the electronic module can be configured to read results of the temperature sensor. The communication circuit 310 may comprise a first electrical circuit, a second electrical circuit and a third electrical circuit, and it can be used to transmit the measured data to outside of the tire 100 via a transmitter.

The accelerometer 10 can be configured to sense acceleration variations and provide an output representative of the variations. The first electrical circuit of the communication circuit 310 can be configured to be responsive to said accelerometer output to provide signals based on said measurements.

A pressure sensor 30b can be configured to sense the pressure of the air within the cavity and provide an output representative of said pressure. The second electrical circuit of the communication circuit 310 can be configured to be responsive to said pressure sensor output to provide signals representative of said air pressure.

A temperature sensor 30a can be configured to sense the temperature of the air within the cavity and to provide an output representative of said temperature. The third electrical circuit of the communication circuit 310 can be configured to be responsive to said temperature sensor output to provide signals representative of said air temperature.

A transmitter of the tire 100 can be coupled to said first, second and third electrical circuits. Further, the transmitter can be adapted to transmit signals representative of said signals.

Thus, a pressure and temperature of the tire and an acceleration, preferably a tangential acceleration, of the tire 100 are advantageously measured in order to determine a load on the tire 100. Most advantageously, a pressure and temperature of each of tires and a radial acceleration of said tires are measured. Further, data based on the measurements is preferably transmitted further, most preferably to a gateway device 600. Thus, the vehicle preferably comprises a receiver, preferably within the gateway device 600, positioned to receive signals transmitted by the transmitter of the tire 100.

The motor vehicle comprising the tire 100 and the gateway device 600 can be configured to determine a load affecting said tire 100 using at least
tire stiffness characteristics, i.e., physical properties of the tire,
at least part of signals obtained from the pressure sensor, and
at least part of signals obtained from the acceleration sensor, and
optionally at least part of signals obtained from the temperature sensor.

The tire 100, most preferably the module 300 of the tire 100, can further comprise means for transferring measurement results (the outputs of the sensor(s), such as analysed and/or filtered outputs of the sensor(s)) 10, 30a, 30b) for example, to a gateway device 600 an example of which is depicted in FIGS. 2a-c.

The gateway device 600 can comprise a display of the gateway device, a processing unit of the gateway device (i.e., a processor of the gateway device), a memory data storage unit of the gateway device and computer code to be executed by the processor of the gateway device, user interface having, for example, an operator display and a keyboard (not shown in the Figures). The data storage unit of the gateway device stores the values of parameters and calculations. The operator display can provide status information and warnings.

The gateway device 600 may be configured to display a value of a contact patch length and/or a value based on acceleration and other values, such as an analysed load, e.g. for a user. The gateway device 600 may be configured to compare a value based on the acceleration and/or a load to a limit value. The gateway device 600 may be configured to send a signal, and/or display a result(s), and/or to use the results further. For example, the gateway device 600 may be configured to send acceleration and/or analysed load data. Such an information may be sent for a user and/or to a cloud server unit 500 and/or used for other processes. In an embodiment, the data is sent and/or used for further processing no matter whether the value is within limit value(s) or not. However, the gateway device 600 may be configured to send data only when the value of acceleration and/or the value of analysed load exceeds the limit value.

The gateway device 600 can have a receiver or a receiver-transmitter, which receives the digital data such as signals transmitted by the tire, preferably the module 300 of the tire 100. For communication purposes gateway device 600 may be equipped with a communication interface, which may be able to communicate with some other devices, e.g. a cloud service unit 500, via short range and/or long-range communication connection. Thus, the monitoring system can further comprise, remote from the vehicle, the cloud service unit 500.

In other words, the gateway device 600 can be configured to communicate with a service provider, such as a mobile phone network. For example, the gateway device 600 may be configured to communicate with a cloud service unit 500 via a mobile phone network. In the alternative, the tire 100, preferably the module 300 of the tire 100, can communicate directly with a service provider, such as a mobile phone network, or for example via a mobile phone network. However, having a gateway device 600 reasonably near the module 300 reduces the power consumption of the module 300. This is beneficial, since the electric source 330 of the module 300 may be hard to change or charge. Thus, most preferably the tire 100 communicates with the gateway device 600 reasonably near the tire 100 and not directly with a service provider, such as a mobile network.

The wireless interaction between the tire 100, most preferably electronic module 300 of the tire 100 comprising the antenna 312, and a receiving device at a distance from the tire 100 preferably operates at least in the range of tens of centimetres, such as from tens of centimeters to several meters. Preferably, the module 300 is configured to send data to a gateway device 600 that is arranged at most 50 metres or at most 20 metres, more preferably at most 10 metres or at most 8 metres, and most preferably at most 5 metres away from the module 300. Preferably, the gateway device 600 is further configured to send data to and receive data from a cloud server unit 500.

Such conveyance of information may be premised, for example, on a Bluetooth data connection. Thus, the module 300 may be configured to communicate with the gateway device 600 through a Bluetooth® technology. If Bluetooth data connection is used, it may have a maximum range of meters to tens of meters or more, depending on conditions and the Bluetooth protocol version being used. The module 300 may be configured to communicate with the gateway device 600 wirelessly using radio waves at a frequency range from 2.4 GHz to 2.485 GHz.

The monitoring system advantageously comprises one gateway device 600 and one module for each of the tires, which modules 300 are transmitting the digital information to the gateway device 600. Each of the tires can be identified so that the processor of the gateway device 600 can know where each tire is located.

The gateway device 600 can further comprise sensor interface for receiving the outputs from the sensor(s), and an analysing element for analysing a load on the tire 100 based on, at least, the received outputs from the sensor(s).

There is also a power supply for supplying power for the operation of the gateway device 600.

The sensor(s) 10, 30, 30*a*, 30*b* can be used to measure an acceleration, a pressure and a temperature of the tire 100. The module 300 can be configured to transmit data to the gateway device 600 (shown in FIGS. 2*a*-*b*). Such conveyance of information may be two-way, i.e. to and from the electronic module 300. However, preferably the information is only transmitted one-way from the module 300 to the gateway device 600. Transmitting information only one-way may save energy of the module 300 and, hence, energy of the tire 100.

The gateway device 600 can be configured to receive data transmissions from all tires of the vehicle and/or from all tires of a plurality of vehicles.

The antenna 312 may be arranged to wirelessly transmit information from the electronic module 300 to a receiving device, i.e., the gateway device 600, located at a distance from the tire 100. The gateway device 600 can be, for example, a device temporarily or permanently installed in a motor vehicle equipped with the tire 100, a cellular telephone of a driver or a passenger of said motor vehicle, or a diagnostic device at a workshop. The gateway device 600 can be integrated into the motor vehicle. Thus, in an embodiment, the gateway device is installed in the vehicle. Preferably, the gateway device 600 is a mobile phone.

As discussed above, the gateway device 600 may further transmit said information to, for example, a computer server or to a cloud server unit 500. Thus, the computer server or the cloud server unit 500 can be used to analyze the information. The information is preferably analyzed in the gateway device 600 and/or in the cloud server unit 500 in order to further decrease the energy consumption of the tire 100. Thus, the processor of the gateway device 600 can be used to determine a load on the tire(s).

The tire can comprise a reinforcing belt, which is located between the electronic module 300 and the tread block 110. The reinforcing belt may be a wire mesh or a belt arranged inside the tire 100. Since the purpose of the reinforcing belt is to reinforce the tire, preferably, the reinforcing belt does not limit large apertures. More precisely, preferably, the reinforcing belt does not limit an aperture having an area of at least 0.5 $cm^2$.

The reinforcing belt can comprise metal. The reinforcing belt may comprise steel, or it may consist of steel. The reinforcing structure may comprise a steel mesh. In addition or alternatively, the reinforcing belt may comprise fibrous material. The fibrous material of reinforcing belt may comprise at least one of cotton, rayon, polyamide (Nylon), polyester, polyethylene terephthalate, and Poly-paraphenylene terephthalamide (Kevlar).

The tire can comprise a ply 155. The ply 155 may comprise fibrous material. The fibrous material of second reinforcing structure 155 may comprise at least one of cotton, rayon, polyamide (Nylon), polyester, polyethylene terephthalate, and Poly-paraphenylene terephthalamide (Kevlar). The purpose of the ply 155 is also to reinforce the tire 100.

The electronic module 300 or at least part of it may be secured in its installing position within the receptacle 400 with a mechanical support. Further, the accelerometer is preferably fixed within the receptacle 400. In addition, further securing may be provided by arranging castable material between the receptacle 400 and the electronic module 300 or that part of the electronic module 300 which is installed in the receptacle 400. For example, the receptacle 400 may serve as a mold for the electronic module 300 such that the electronic module 300 is inserted into the receptacle 400, after which the castable material is mold into the receptacle 400. This can cause very reliable installing for the module 300 and/or the accelerometer 10. Such castable material may be adhesive. Such castable material may be, for example, epoxy, polyurethane, acrylic, silicone, or another thermoset polymer or thermoplastic polymer-based adhesive.

A receptacle 400 may be connected to the inner surface 130 of the tire 100 adhesively (shown in FIG. 6*a*). In such a case, there is adhesive 460 between the receptacle 400 and the inner surface 130 of the tire 100. Such adhesive 460 may comprise, for example, thermoset polymer or thermoplastic polymer-based adhesive. Suitably, the adhesive 460 is selected from a group comprising epoxy, polyurethane and acrylic.

Further, an accelerometer 10 may be connected to the inner surface 130 of the tire 100 adhesively. In this case, there is adhesive between the accelerometer and the inner surface 130 of the tire 100. Such adhesive may comprise, for example, thermoset polymer or thermoplastic polymer-based adhesive. Advantageously, the adhesive comprises epoxy adhesive, polyurethane adhesive, cyanoacrylate adhesive and/or acrylic adhesives. More preferably, the adhesive is selected from a group consisting of epoxy adhesives, polyurethane adhesives, cyanoacrylate adhesives and acrylic adhesives. In this case also, the accelerometer 10 is preferably, at least partly, inside the receptacle 400.

The receptacle 400 can comprise a wall or walls 402. Such wall(s) 402 may comprise, for example, polymer material, such as rubber or another thermoplastic elastomer. For example, the receptacle 400 can comprise a substantially circular wall 402. As another example, the receptacle 400 can comprise more than one walls 402, such as four walls. The wall(s) 402 can provide support for the accelerometer 10 and/or the electronic module 300 or that part of the electronic module 300 which is installed in the receptacle 400. For additional support especially along the radial direction SR, the inner side(s) of the wall(s) 402 may comprise surface roughness. Such surface roughness may provide increased friction or grip between the accelerometer and/or the electronic module 300 and the inner side(s) of the wall(s) 402 of the receptacle 400 and/or between the above-mentioned castable material and the inner side(s) of the wall(s) 402 of the receptacle 400. The roughness value $R_a$ of such surface roughness may be, for example, at least 5 micrometers. Such surface roughness may be brought about, for example, by sandblasting, or it may be an inherent manufacturing-induced property of the wall(s) 402. The preceding applies, mutatis mutandis, to the surface roughness of the electronic module 300 as well.

The wall(s) 402 of the receptacle 400 can limit at least a first opening 410 and a second opening 420. The wall(s) 402 of the receptacle 400 can limit, for example, a first opening 410, a second opening 420 and a third opening. As another alternative, the wall(s) 402 of the receptacle 400 may limit a first opening 410 and a second opening 420 and a third opening and a fourth opening—and so on. That is, there may be, in addition to the first opening 410, one or more openings to the side of the receptacle 400 in its wall(s) 402.

The second opening 420 and/or any additional openings to the side of the receptacle 400, can serve the purpose of enabling a part of the electronic module 300 to extend through the second opening 420, whereby the wall(s) 402 laterally surround(s) only the first part 301, i.e. the rest, of the electronic module 300. In other words, only the first part 301 of the electronic module 300 is housed within the receptacle 400 while a second part 302 of the electronic module 300 extends through the second opening 420 to outside the receptacle 400. Thus, a part of the second part 302 of the electronic module remains outside the receptacle 400. The extending of the second part 302 of the electronic module 300 to outside the receptacle 400 through the second opening 420 has the technical effect of keeping the electronic module 300 more securely in place by providing mechanical support for the electronic module 300 especially in the radial direction SR, and by preventing the electronic module 300 from rotating within the receptacle 400. For example, the wall(s) 402 may laterally surround at least the power source 330 of the electronic module 300.

The part or parts of the electronic module 300 thusly arranged outside the receptacle 400 can comprise, for example, the antenna 312 or at least a part of the antenna 312, as illustrated in FIG. 5. Antennas or parts of the antenna 312 could be arranged to the second part 302 and third part 303 of the module 300. To enable its wireless information transmittal functionality, the antenna 312 can be electrically connected to the first part 301 of the electronic module 300 which is surrounded by the wall(s) 402 of the receptacle.

By arranging at least part of the antenna 312 to be the part of the electronic module 300 which resides outside the receptacle has the benefit of foregoing the need to arrange an additional extending member or members in the electronic module 300 to extend through the second opening 420 and possibly the third and further such openings of the receptacle 400.

By arranging at least part the antenna 312 to be the part of the electronic module 300 which resides outside the receptacle 400 has the additional benefit of improving the signal strength of the antenna 312 as the signal is not obstructed by the wall(s) 420 of the receptacle 400 and/or the other parts of the electronic module 300 housed within the receptacle 400. This may be particularly advantageous in a tire 100 comprising a reinforcing belt 150 because the reinforcing belt 150, especially if comprising steel, may already dampen the signal between the antenna 312 and any receiving device outside the tire 100.

The receptacle 400 can be arranged such that a first end 407 of the receptacle 400 is connected to the inner surface 130 of the tire 100, and the second end 408, which is opposite to the first end 407, limits the first opening 410. That is, the first end 407 may be against and attached to the inner surface 130 of the tire, while the second end 408 defines the first opening 410 of the receptacle 400. In such a case, the receptacle 400 may first be attached to the inner surface 130 of the tire, and afterwards the electronic module 300 may be installed in the receptacle 400 in consistency with what has been described above about the partial residence of the electronic module 300 in its installed position within the receptacle 400.

The receptacle 400 may have such a shape that the interior of the receptacle 400, which is configured to receive the first part 301 of the electronic module 300, tapers towards the first opening 410. This has the effect that the wall(s) 402 resist a movement of the electronic module 300 out from the receptacle 400.

The first end 407 of the receptacle 400 may comprise a flange 405 such that the flange 405 is connected to the inner surface 130 of the tire 100 when the receptacle 400 is connected to the inner surface 130 of the tire 100. Such a flange 405 has the benefit of providing a greater contact area between the receptacle 400 and the inner surface 130 of the tire 100. Thus, if the receptacle 400 is adhesively connected to the inner surface 130 of the tire 100, the flange 405 provides a greater area for adhesive 460, thereby enabling a stronger adhesive force between the receptacle 400 and the inner surface 130 of the tire 100. Such a flange 405 may be circular or substantially circular, non-circular or substantially non-circular.

The receptacle 400 may be manufactured, for example, by molding such as injection molding or compression molding. Different materials, such as different varieties of rubber, may be used in the construction of the receptacle 400 in accordance with what is described above by, for example, curing the preformed receptacle 400 such that the different materials may be thereby joined together. Different materials may be used in the construction of the receptacle 400 in accordance with what is described above also by, for example, joining the constitutive elements together by known methods such as by adhesion.

The antenna 312 of the tire 100 and the module therein, or that part of it which extends through the second opening 420 of the receptacle may be at a distance from the inner surface 130 of the tire 100. A distance between the antenna 312 and the surface 130 of the tire has the benefit of not directly mechanically subjecting the antenna 312 to the impacts experienced by the tire 100 and transmitted to the inner surface 130 of the tire, as the antenna 312 is not in a direct contact with the inner surface 130.

The wall(s) 402 of the of receptacle 400 may comprise a protrusion 450 or several protrusions 450. Such protrusion(s) 450 may be located inside the receptacle 400 and protrude inwards. Such protrusion(s) 450 have the advantage of providing the electronic module 300 with additional mechanical support in its installed position within the receptacle 400, and thereby facilitate keeping the electronic module 300 firmly in its installed position within the receptacle 400.

The inside floor 403 of the receptacle 400 may comprise a bulge 455. Such a bulge 455 may be used to provide guidance for the electronic module 300 with respect to the correct installed position of the electronic module 300 within the receptacle 400. In such a case, the electronic module 300 comprises a corresponding recess on its lower surface (not specifically illustrated).

The disclosed monitoring method can comprise the following steps:
  detecting a contact of the first tread area portion with the surface 900 by sensing the acceleration of the first tread area portion by said accelerometer 10, wherein a signal of said accelerometer 10 shows a deformation of said first tread area portion during passage of said first tread area portion in the contact patch,
  determining a time required for the tire to make one rotation using the acquired acceleration signals,
  detecting when the first tread area portion is on the contact patch, preferably on the trailing edge 22 of the contact patch 20, by using the acquired acceleration signal,
  switching the control unit 50 from the normal mode to the power saving mode after said detection, and
  switching from the power saving mode to the normal mode when a first specified time depending on the rotation speed of the tire, such as between 0.15 and 0.99 times the time required for the tire to make one revolution, has elapsed since said detection that the first tread area portion is on the trailing edge 22 of the contact patch 20.

The method can further comprise:
  detecting when the first tread area portion is on the leading edge 21 of the contact patch 20 by using the acquired acceleration signals,
  switching the control unit from the normal mode to the power saving mode after said detection that the first tread area portion is on the leading edge 21 of the contact patch 20,
  switching the control unit from the power saving mode to the normal mode when a second specified time depending on the rotation speed of the tire, such as between 0.01 and 0.05 times the time required for the tire to make one revolution, has elapsed.

The method can further comprise:
  measuring a pressure of a tire 100,
  measuring a temperature of a tire 100,
  determining a load on said tire 100 using, for example,
    the contact patch length 20L of the tire 100,
    tire stiffness characteristics of the tire 100,
    pressure of the tire 100, and
    temperature of the tire 100.

The method can further comprise:
  determining a load of the vehicle by measuring a load on each of the tires 100.

A method for determining the total mass and mass distribution of a vehicle supported by a plurality of wheels each comprising a tire, wherein each tire has a contact patch 20 between the tire and a surface 900, the contact patch 20 being between a leading edge 21 and a trailing edge 22, wherein geometric parameters of each of tires are known, can comprise the following steps:
  measuring the pressure by the pressure sensor 30b,
  generating a signal representative of the pressure,
  measuring the temperature by the temperature sensor 30a,
  generating a signal representative of the temperature,
  measuring acceleration by the accelerometer 10,
  determining the rotational period of the tire 100,
  detecting the leading edge 21 and trailing edge 22 of the contact patch 20 using power saving mode as disclosed in this application,
  generating a signal representative of the contact patch length 20L,
  transmitting said generated signals to a gateway device 600,
  optionally, transmitting said generated signals to a cloud server unit 500,
  computing the total mass on the tire 100 on the gateway device 600 and/or the cloud server unit based on said generated signals from the tire and known geometric parameters of the tire.

Thus, as disclosed in this application, a minimization of energy consumption may be obtained due to the novel solution comprising the power saving mode. Therefore, a contact patch length of a tire can be determined with an accelerometer, even if the battery of the tire can be hard to change or charge.

The invention claimed is:

1. A pneumatic tire configured to rotate about an axis of rotation, the tire comprising
  a tread comprising a first tread area portion, the tread being configured to form a contact with a surface when the tire is used, wherein an area of said contact of the tread with the surface forms a contact patch having a leading edge and a trailing edge,
  a power source,
  a transmission device,
  an accelerometer arranged between the first tread area portion and the axis of rotation, and
  a control unit configured to operate in a power saving mode and a normal mode, wherein in said normal mode the control unit is configured to measure acceleration by the accelerometer, and
  in the power saving mode the control unit is configured to save power by not measuring acceleration by the accelerometer,
  wherein
    a contact of the first tread area portion with the surface is detected by sensing the acceleration by said accelerometer,
    time required for the tire to make one revolution is determined,
    the control unit is configured to switch from the normal mode to the power saving mode after a detection that the first tread area portion is on the contact patch, and
    the control unit is configured to switch from the power saving mode to the normal mode when a first specified time depending on the rotation speed of the tire, comprising between 0.10 and 0.99 times the time required for the tire to make one revolution, has elapsed since said detection that the first tread area portion is on the contact patch, in order to detect the leading edge and/or the trailing edge of the contact patch.

2. The pneumatic tire according to claim 1, wherein the control unit is configured to switch from the normal mode to the power saving mode after a detection that the first tread area portion is on the trailing edge of the contact patch, and the control unit is configured to switch from the power saving mode to the normal mode when a first specified time depending on the rotation speed of the tire, comprising between 0.10 and 0.98 times the time required for the tire to make one revolution, has elapsed since said detection that the first tread area portion is on the trailing edge of the contact patch.

3. The pneumatic tire according to claim 1, wherein:
the control unit is configured to switch from the normal mode to the power saving mode after a detection that the first tread area portion is on the leading edge of the contact patch, and
the control unit is configured to switch from the power saving mode to the normal mode when a second specified time depending on the rotation speed of the tire, comprising between 0.01 and 0.05 times the time required for the tire to make one revolution, has elapsed since said detection that the first tread area portion is on the leading edge of the contact patch.

4. The pneumatic tire according to claim 3, wherein the pneumatic tire further comprises a module comprising: a processor, which is configured to determine said first specified time, and the second specified time.

5. The pneumatic tire according to claim 1, wherein the control unit is configured to be in the power saving mode at least 20%, of a time required for the tire to make one revolution, and the leading edge and/or the trailing edge are detected by the accelerometer during said one revolution of the tire.

6. The pneumatic tire according to claim 1, wherein control unit is configured to switch from the normal mode to a transmission mode after the determination of the contact patch length, wherein the transmission mode the transmission device is configured to transmit data relating to the contact patch length of the tire outside from the tire.

7. The pneumatic tire according to claim 1, wherein control unit is configured to switch from the normal mode to the power saving mode
after the determination of the contact patch length; and/or
after data relating to the contact patch length is transmitted.

8. The pneumatic tire according to claim 7, wherein the control unit is configured to switch from the power saving mode to the normal mode due to variation of a tire pressure exceeding a predetermined value.

9. The pneumatic tire according to claim 7, wherein the control unit is configured to switch from the power saving mode to the normal mode due to a start of movement of the motor vehicle, a start of movement of the motor vehicle following a halting of the vehicle for a period exceeding a predetermined stopping time.

10. The pneumatic tire according to claim 7, wherein the control unit is configured to switch from the power saving mode to a normal mode due to triggering of the control unit by an external command.

11. The pneumatic tire according to claim 1, wherein:
measurement frequency of the accelerometer is between 200 and 1 000 Hz, when the control unit is on the normal mode and the speed of a vehicle having the tire is between 5 km/h, and less than 30 km/h,
measurement frequency of the accelerometer is between 200 and 7 000 Hz, when the control unit is on the normal mode and the speed of a vehicle having the tire is between 30 km/h and less than 50 km/h, and
measurement frequency of the accelerometer is between 1000 and 7 000 Hz, when the control unit is on the normal mode and the speed of a vehicle having the tire is between 50 km/h and 100 km/h.

12. The pneumatic tire according to claim 1, wherein the tire further comprises
a pressure sensor, and
a temperature sensor,
wherein the transmission device is configured to transmit data relating to pressure of the tire,
temperature of the tire, and
contact patch length of the tire.

13. A monitoring system comprising the pneumatic tire according to claim 1, wherein the monitoring system is configured to determine a load affecting the tire based on at least
tire stiffness characteristics of the tire,
contact patch length of the tire, and
pressure of the tire,
and a temperature of the tire, and/or a friction between the tire and the surface.

14. The monitoring system according to claim 13, the monitoring system further comprising a gateway device comprising
a processing unit,
a data storage unit for values of parameters and calculations, and
computer code to be executed by the processing unit,
wherein the gateway device is configured to determine the load affecting the tire based on at least:
the tire stiffness characteristics of the tire,
the contact patch length of the tire, and
the pressure of the tire,
and the temperature of the tire, and/or the friction between the tire and the surface.

15. The monitoring system according to claim 14, wherein the monitoring system comprises a vehicle, wherein the gateway device is configured to determine a total load affecting a vehicle based on the determined load of the at least one tire.

16. A monitoring method for saving energy consumption of a pneumatic tire, comprising the following steps:
acquiring acceleration signals by sensing an acceleration by an accelerometer arranged between a first tread area portion of the tire and an axis of rotation of the tire,
detecting a contact of the first tread area portion of the tire with a surface by the accelerometer,
determining a time required for the tire to make one revolution using the acquired acceleration signals,
detecting when the first tread area portion is on a contact patch, using the acquired acceleration signals,
switching a control unit from the normal mode to the power saving mode after said detection that the first tread area portion is on the contact patch, and
switching from the power saving mode to the normal mode when a first specified time depending on the rotation speed of the tire, comprising between 0.15 and 0.99 times the time required for the tire to make one revolution, has elapsed since said detection that the first tread area portion is on the contact patch.

* * * * *